United States Patent
Kang et al.

(10) Patent No.: US 11,533,762 B2
(45) Date of Patent: Dec. 20, 2022

(54) METHOD FOR PERFORMING UPLINK TRANSMISSION IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 17/257,714

(22) PCT Filed: Jul. 4, 2019

(86) PCT No.: PCT/KR2019/008250
§ 371 (c)(1),
(2) Date: Jan. 4, 2021

(87) PCT Pub. No.: WO2020/009510
PCT Pub. Date: Jan. 9, 2020

(65) Prior Publication Data
US 2021/0176797 A1 Jun. 10, 2021

(30) Foreign Application Priority Data
Jul. 4, 2018 (KR) .................... 10-2018-0077371

(51) Int. Cl.
*H04W 74/08* (2009.01)
*H04W 52/42* (2009.01)
(Continued)

(52) U.S. Cl.
CPC ...... *H04W 74/0833* (2013.01); *H04B 7/0404* (2013.01); *H04L 25/0226* (2013.01);
(Continued)

(58) Field of Classification Search
CPC .... H04B 7/0404; H04W 52/42; H04W 56/00; H04W 56/005; H04W 72/0413;
(Continued)

(56) References Cited

U.S. PATENT DOCUMENTS

2013/0010711 A1    1/2013  Larsson et al.
2017/0223690 A1*   8/2017  Zeng ................. H04L 27/2675
(Continued)

FOREIGN PATENT DOCUMENTS

KR    1020130102095    9/2013
KR    1020140066710    6/2014
(Continued)

OTHER PUBLICATIONS

PCT International Search Report in International Appln. No. PCT/KR2019/008250, dated Oct. 30, 2019, 7 pages (with English translation).

*Primary Examiner* — Pao Sinkantarakorn
(74) *Attorney, Agent, or Firm* — Fish & Richardson P.C.

(57) ABSTRACT

The present specification relates to a method for performing uplink transmission in a wireless communication system. More particularly, a method performed by a terminal comprises the steps of: transmitting a PRACH preamble to a base station on the basis of a transmission unit indicating a physical layer resource set; receiving, from the base station, a random access response (RAR) including a TA value; and transmitting the uplink signal on the basis of the RAR, wherein transmission unit setting information about the transmission unit, set in the terminal, is transmitted through the PRACH preamble or the uplink signal to the base station.

15 Claims, 27 Drawing Sheets

(51) Int. Cl.
*H04W 72/04* (2009.01)
*H04W 76/11* (2018.01)
*H04L 25/02* (2006.01)
*H04W 56/00* (2009.01)
*H04W 74/00* (2009.01)
*H04B 7/0404* (2017.01)
*H04W 4/38* (2018.01)
*H04W 4/44* (2018.01)
*H04J 11/00* (2006.01)

(52) U.S. Cl.
CPC ......... *H04W 52/42* (2013.01); *H04W 56/005* (2013.01); *H04W 72/0453* (2013.01); *H04W 72/0473* (2013.01); *H04W 74/004* (2013.01); *H04W 74/008* (2013.01); *H04W 76/11* (2018.02); *H04J 11/0079* (2013.01); *H04W 4/38* (2018.02); *H04W 4/44* (2018.02)

(58) Field of Classification Search
CPC ......... H04W 72/0453; H04W 72/0473; H04W 74/008; H04W 74/0833
See application file for complete search history.

(56) References Cited

U.S. PATENT DOCUMENTS

2017/0279580 A1\* 9/2017 Chen .................... H04W 72/042
2018/0235013 A1\* 8/2018 Jung ................. H04W 56/0045
2020/0037365 A1\* 1/2020 Takahashi ............... H04L 27/26
2021/0297126 A1\* 9/2021 Cao ...................... H04J 11/0069

FOREIGN PATENT DOCUMENTS

KR    1020160051789    5/2016
WO    WO2018009595    1/2018

\* cited by examiner

[FIG. 1]
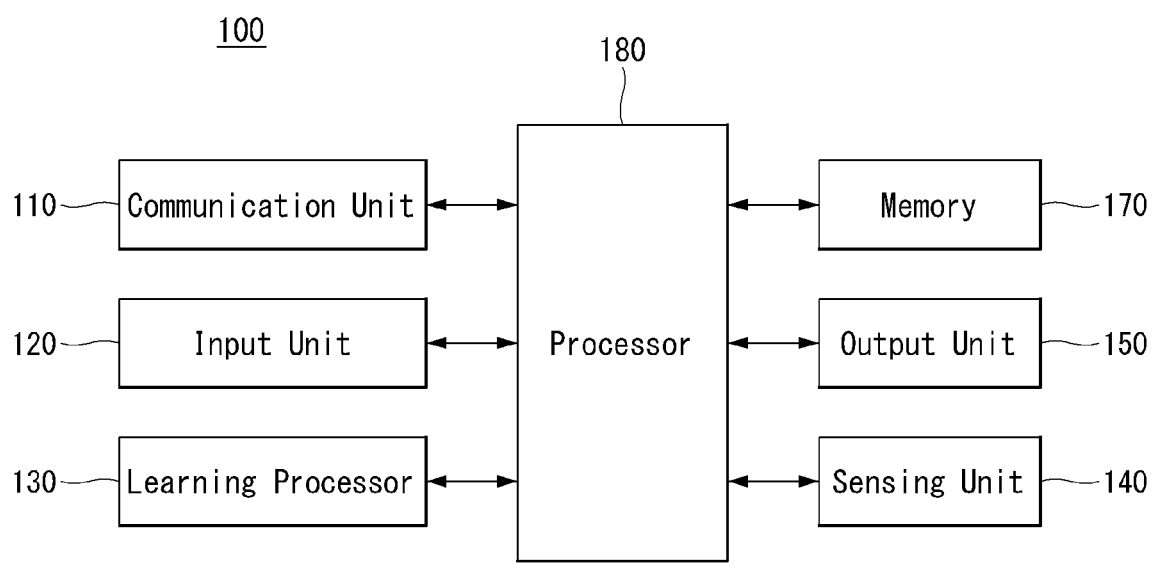
[FIG. 2]
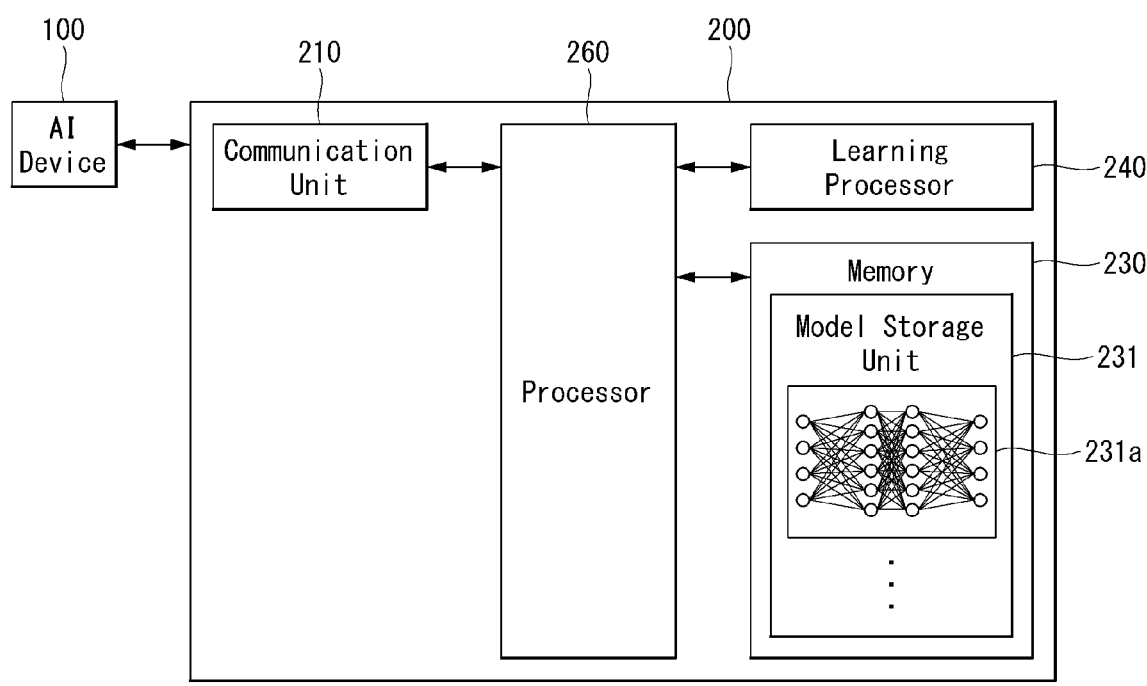

[FIG. 3]
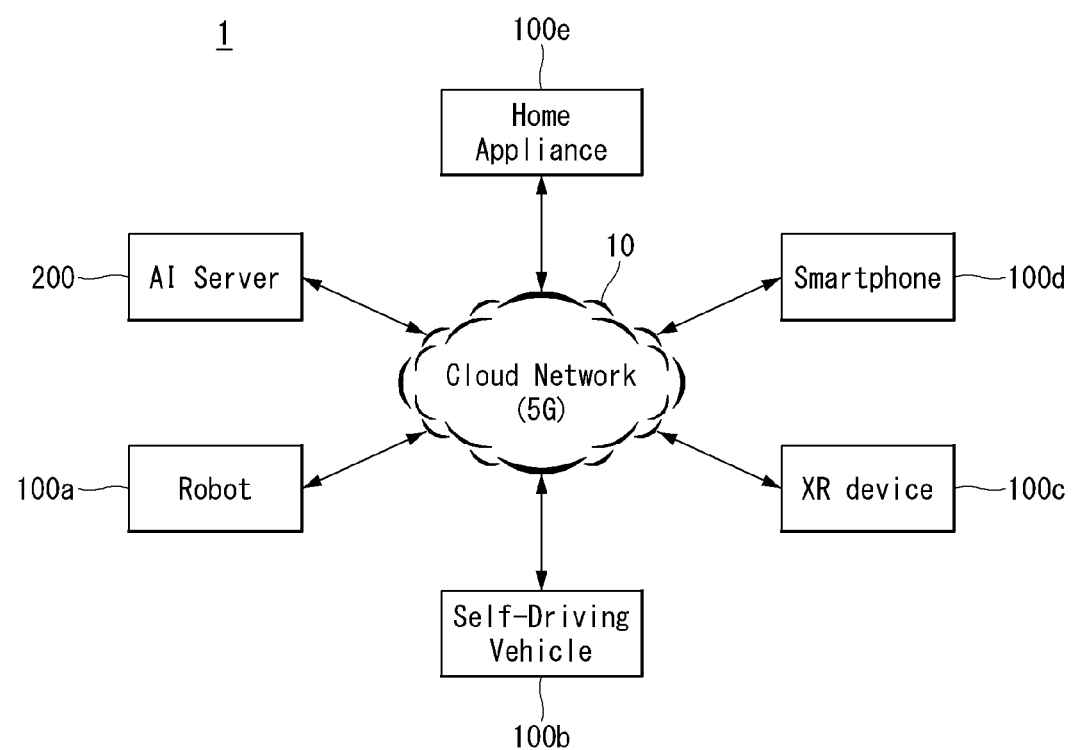

[FIG. 4]
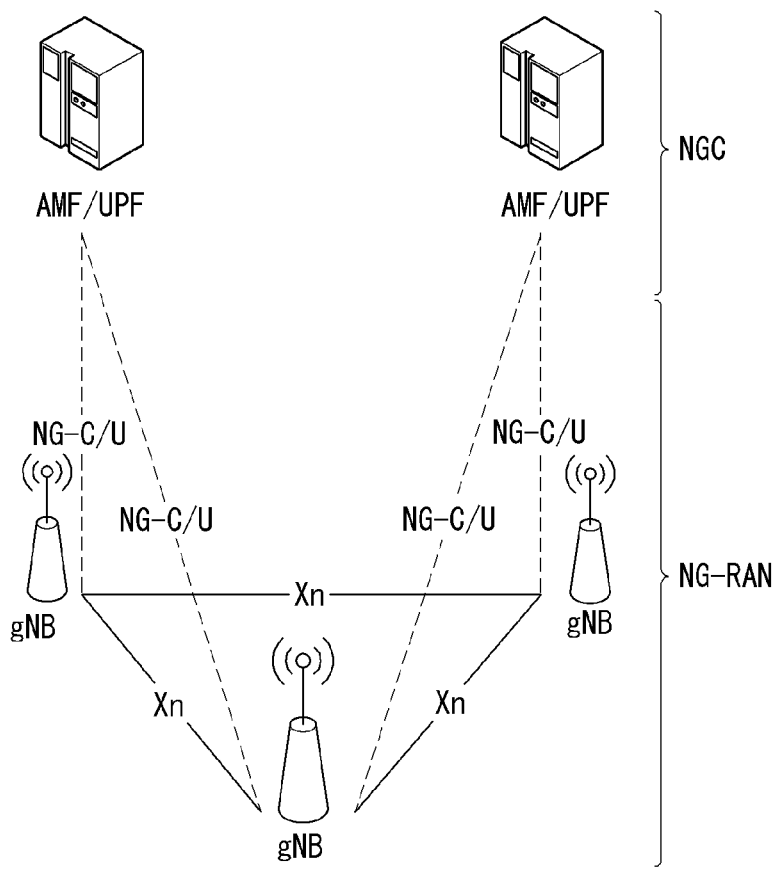
[FIG. 5]
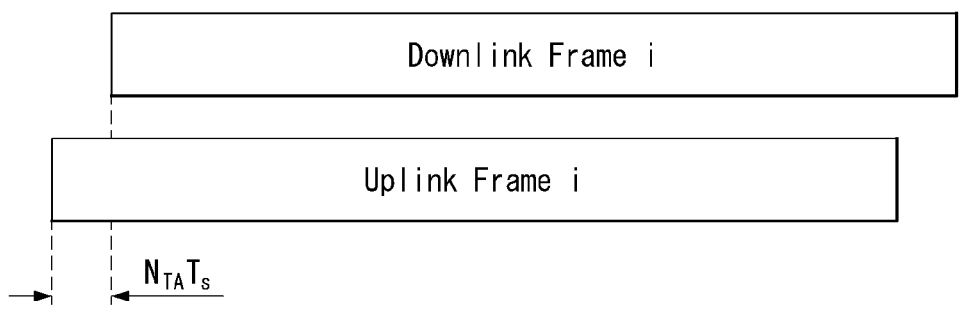

[FIG. 6]
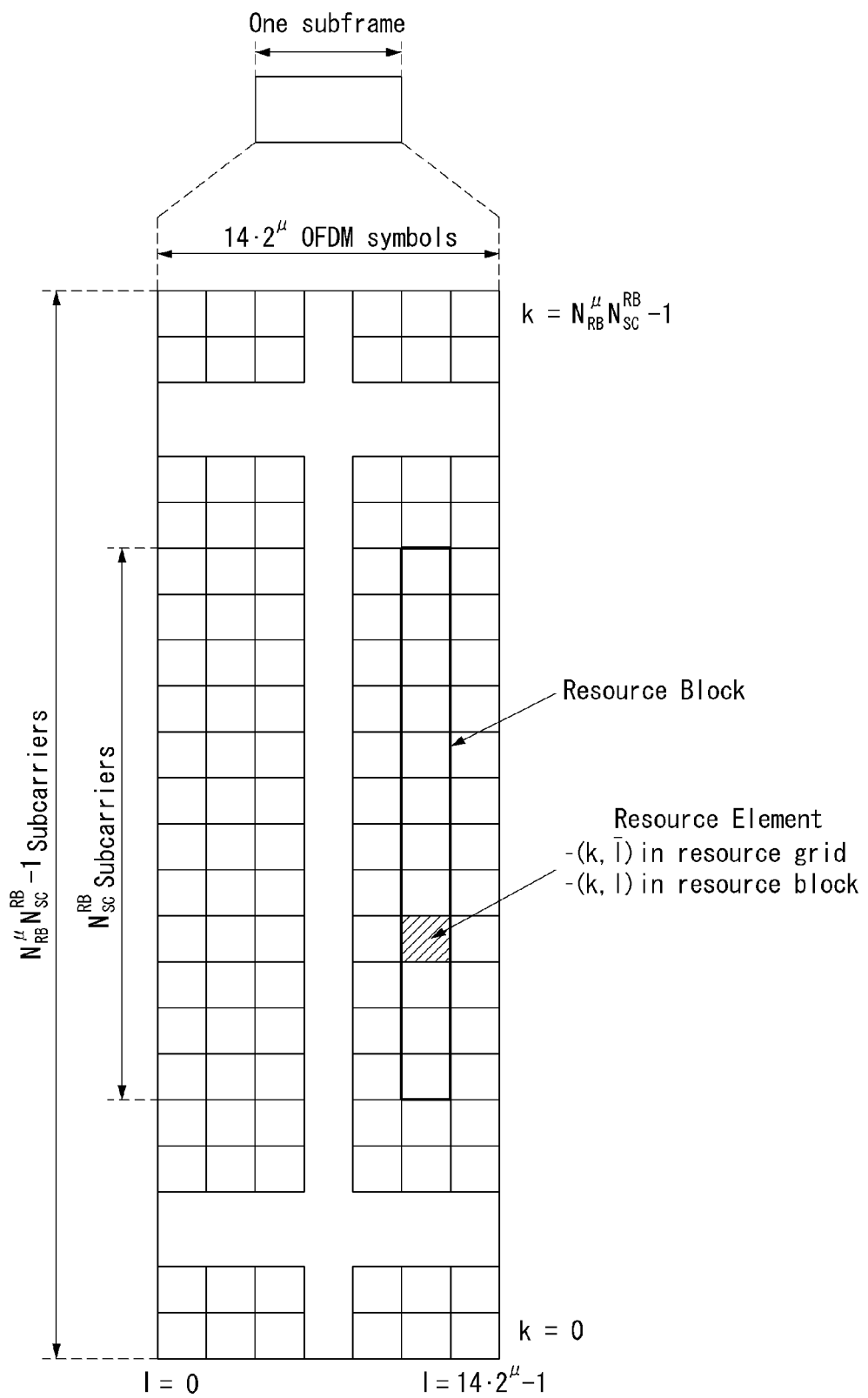

[FIG. 7]
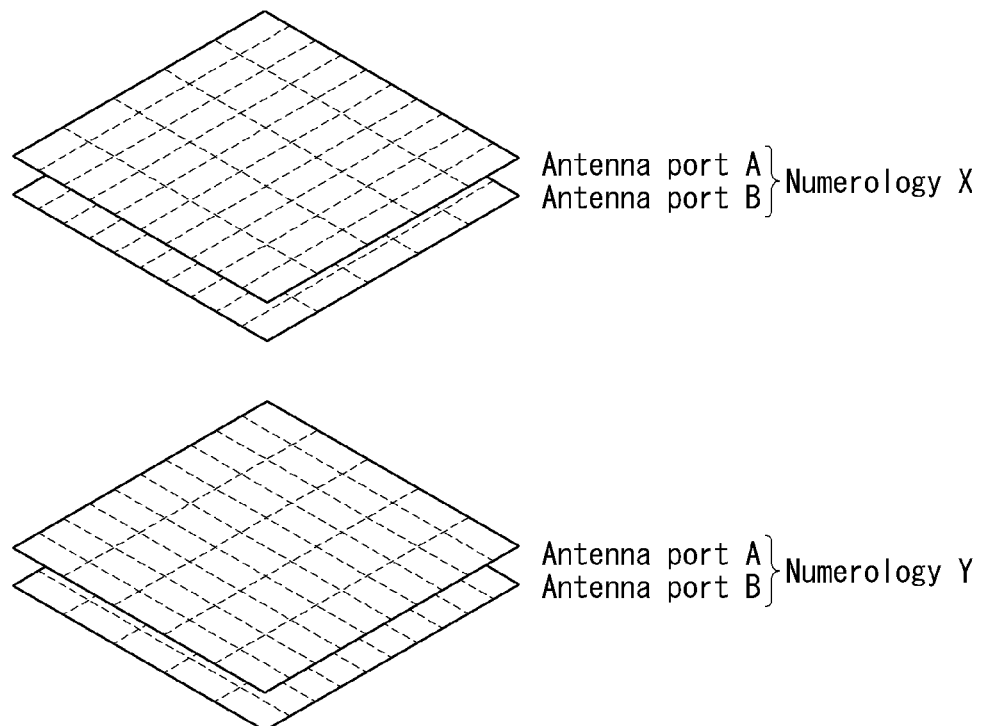

[FIG. 8]
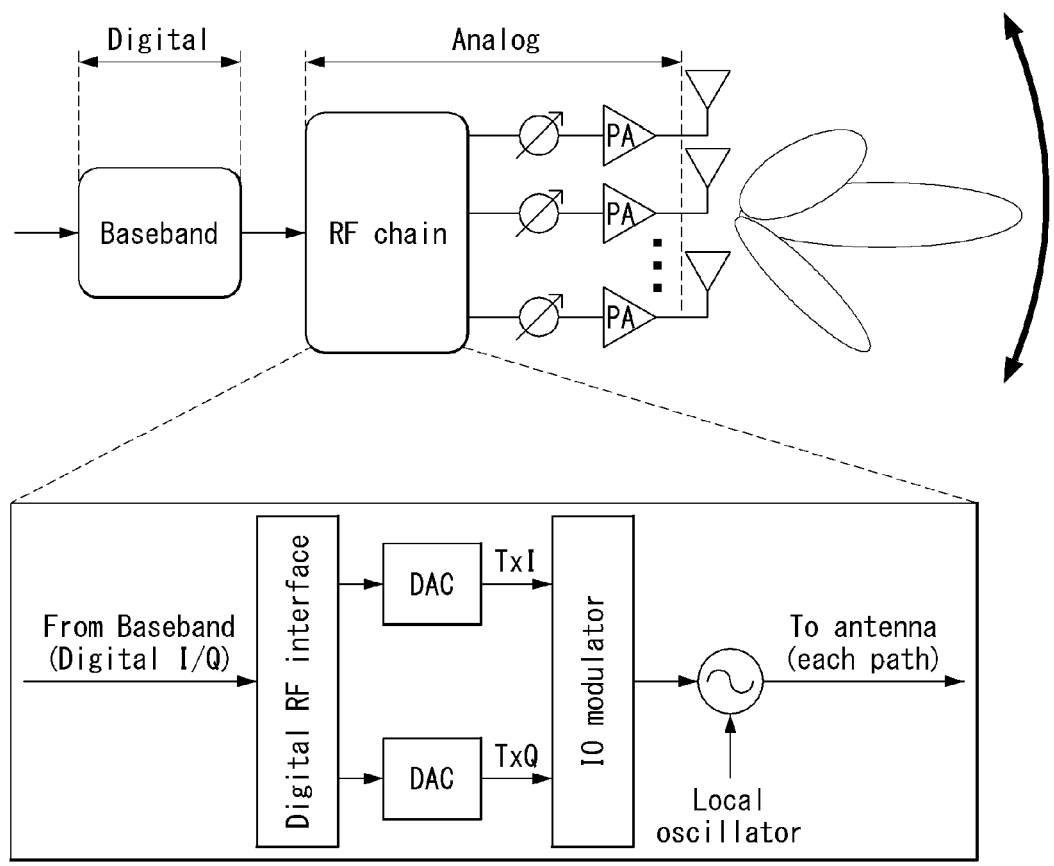

[FIG. 9]
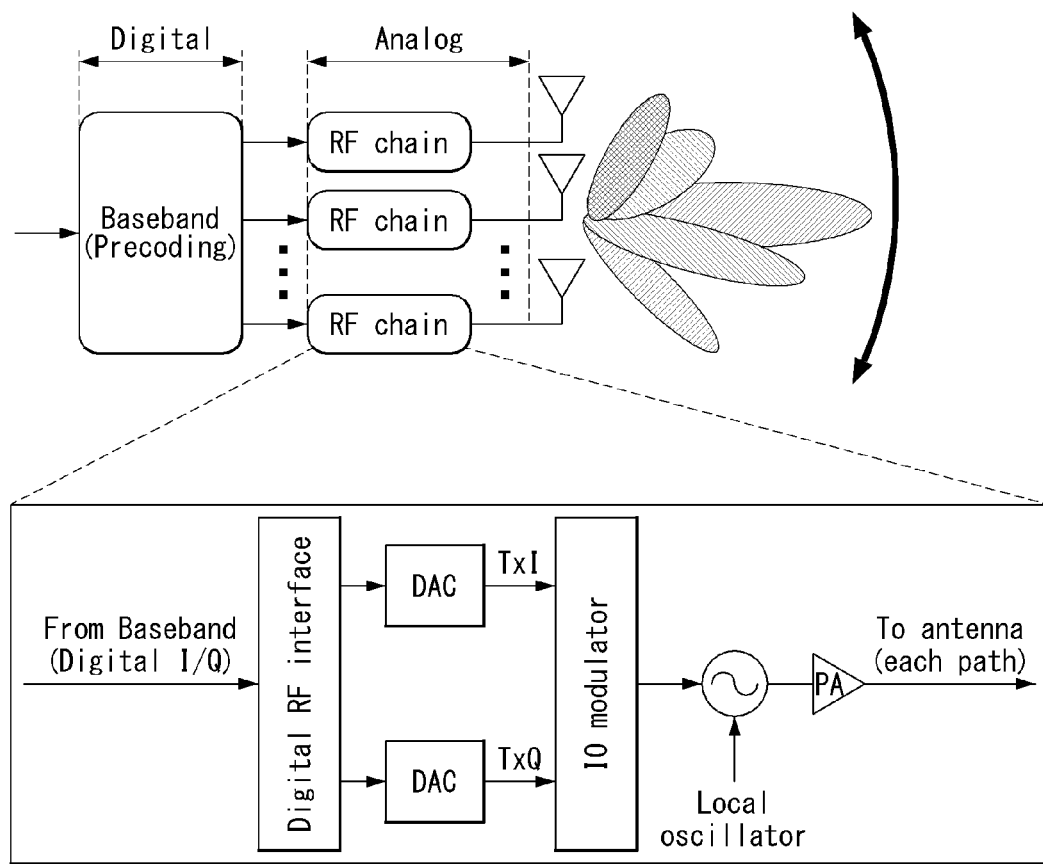

[FIG. 10]
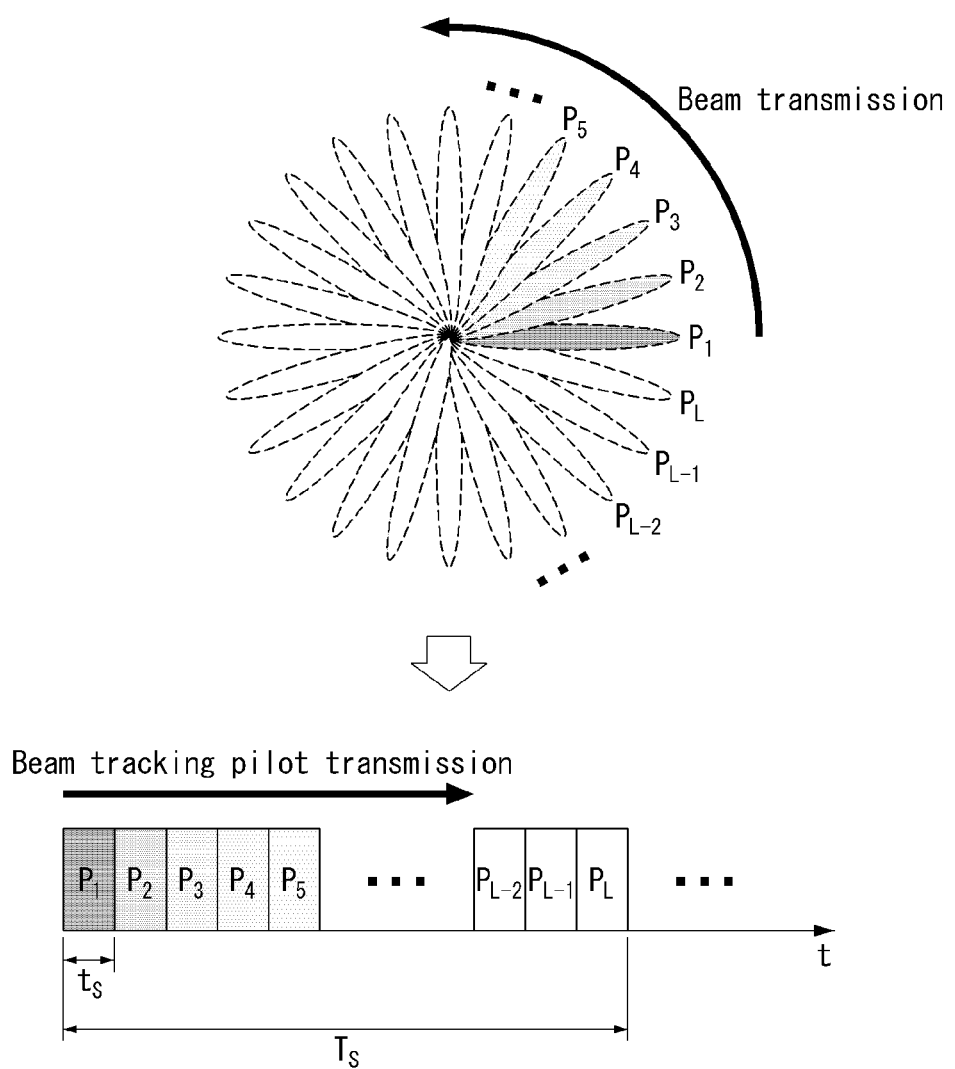

[FIG. 11]
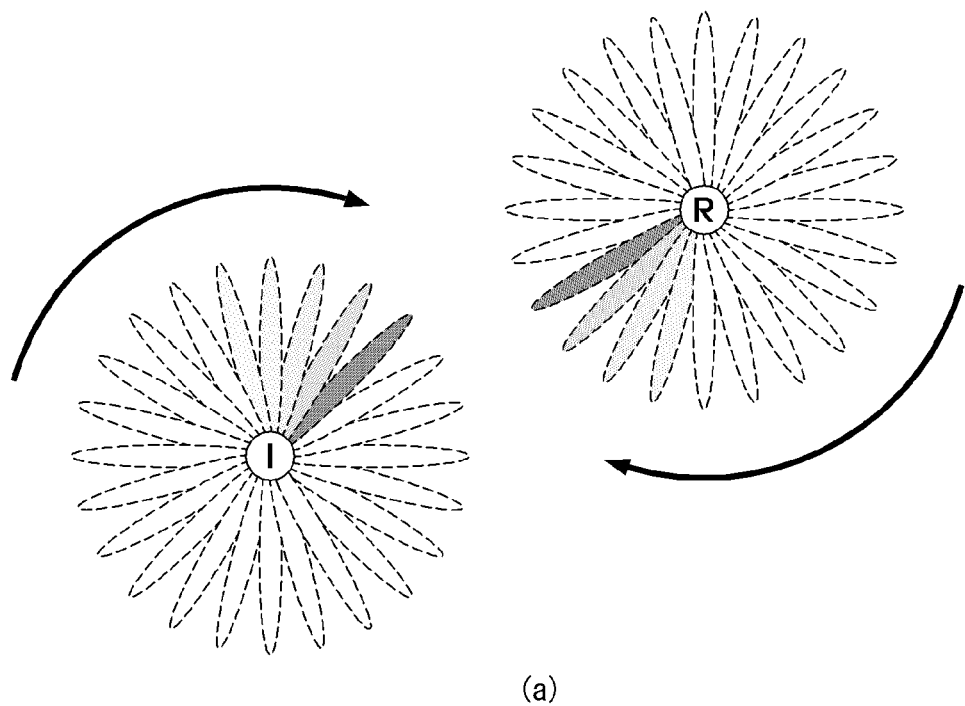
(a)
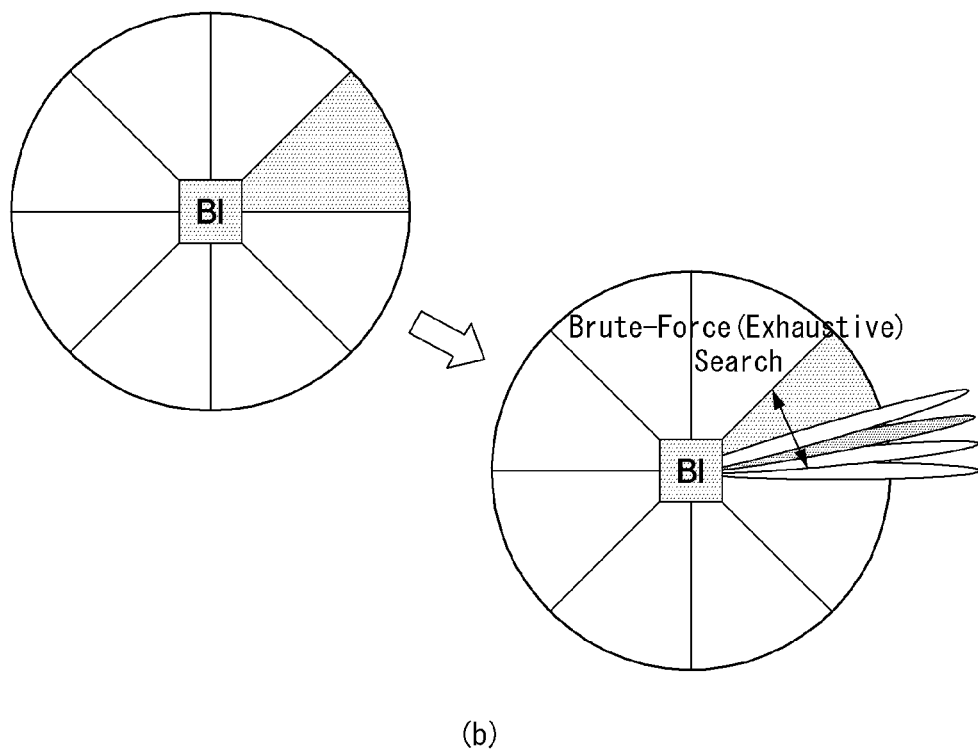
(b)

[FIG. 12]

|←─────────────────────────── RACH slot ───────────────────────────→|

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| A1 | A1 | A1 | A1 | A1 | A1 | A1 | A1 | A1 | A1 | A1 | A1 | Null | |
| A1 | A1 | A1 | A1 | A1 | A1 | A1 | A1 | A1 | A1 | A1/B1 | | | |
| B1 | B1 | B1 | B1 | B1 | B1 | B1 | B1 | B1 | B1 | B1 | B1 | | |
| A2 | | | | A2 | | | | A2 | | | | Null | |
| A2 | | | | A2 | | | | A2/B2 | | | | | |
| A3 | | | | | | A3 | | | | | | Null | |
| A3 | | | | | | A3/B3 | | | | | | | |
| B4 | | | | | | | | | | | | | |
| C0 | | C0 | | C0 | | C0 | | C0 | | C0 | | | |
| C2 | | | | | | C2 | | | | | | | |

(a) Starting OFDM symbol is '0'

|←─────────────────────────── RACH slot ───────────────────────────→|

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| | Null | A1 | A1 | A1 | A1 | A1 | A1 | A1 | A1 | A1 | A1 | A1 | A1 |
| | Null | A1 | A1 | A1 | A1 | A1 | A1 | A1 | A1 | A1 | A1 | A1/B1 | |
| | Null | B1 | B1 | B1 | B1 | B1 | B1 | B1 | B1 | B1 | B1 | B1 | B1 |
| | Null | A2 | | | | A2 | | | | A2 | | | |
| | Null | A2 | | | | A2 | | | | A2/B2 | | | |
| | Null | A3 | | | | | | A3 | | | | | |
| | Null | A3 | | | | | | A3/B3 | | | | | |
| | Null | B4 | | | | | | | | | | | |
| | Null | C0 | | C0 | | C0 | | C0 | | C0 | | C0 | |
| | Null | C2 | | | | | | C2 | | | | | |

(b) Starting OFDM symbol is '2'

[FIG. 13]
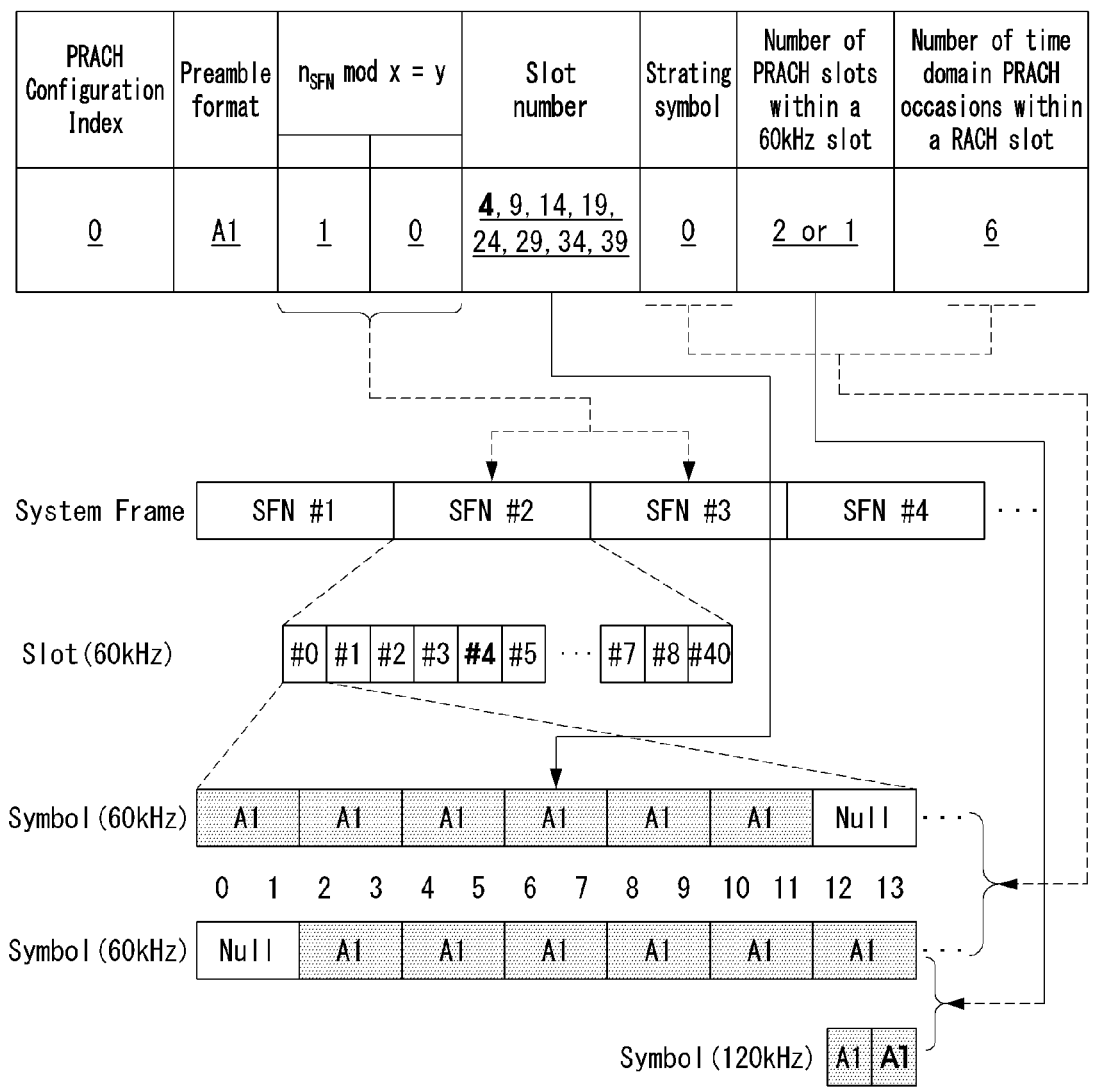

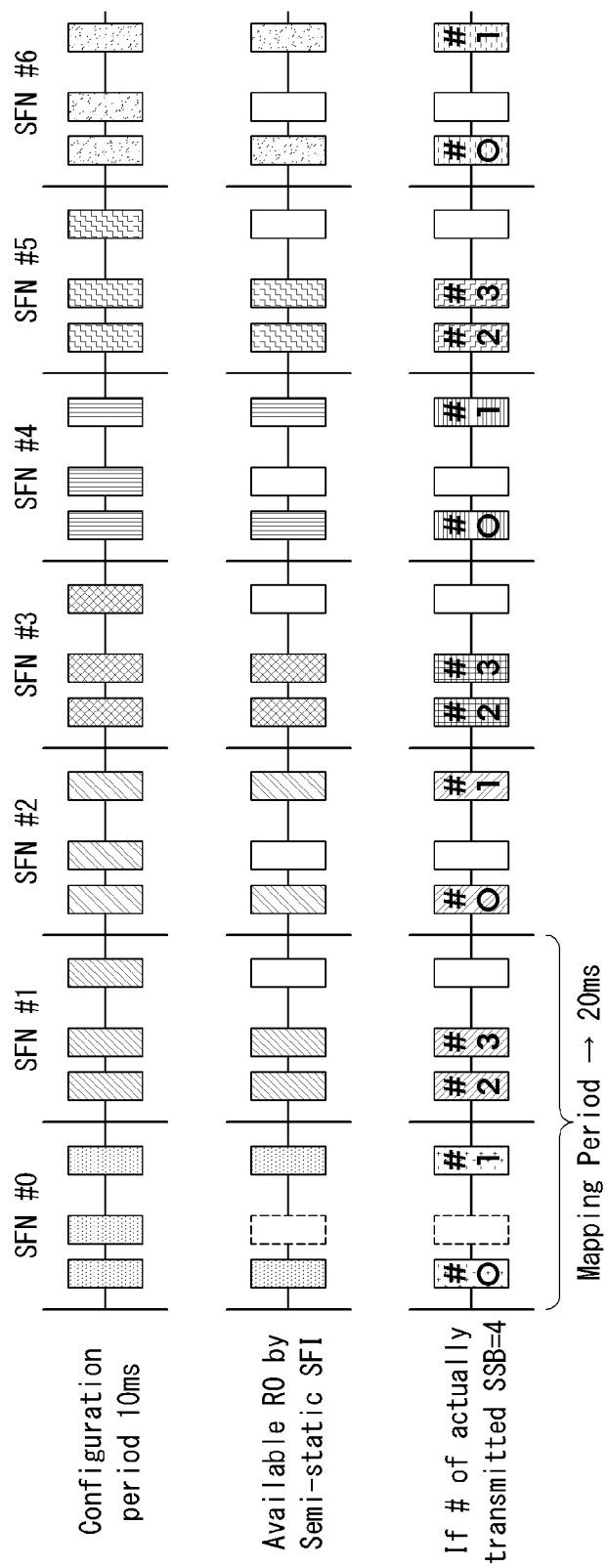
[FIG. 14]

[FIG. 15]
· Contention based
(a)
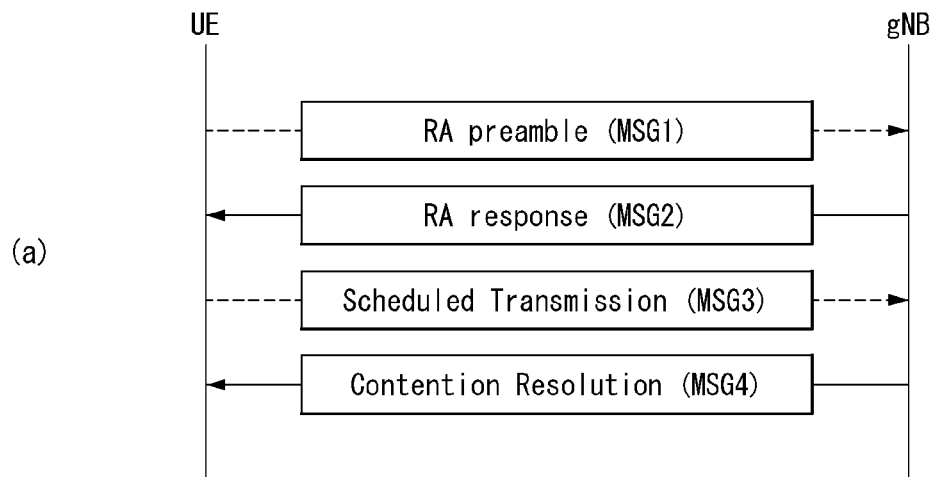
· Contention-free
(b)
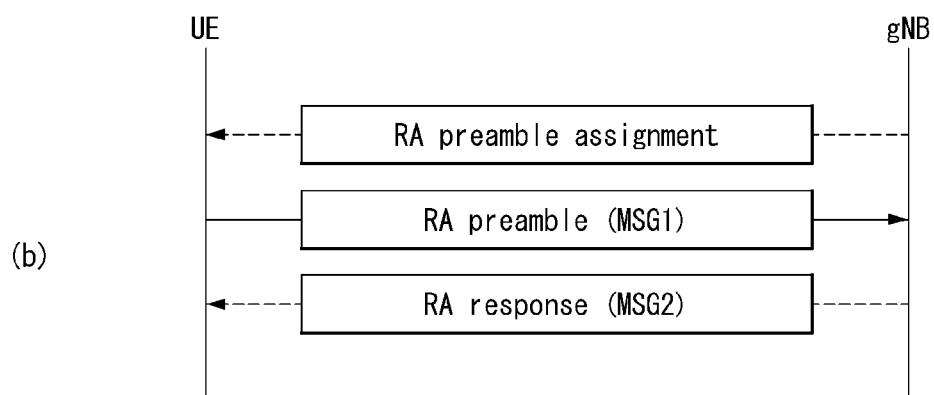

[FIG. 16]
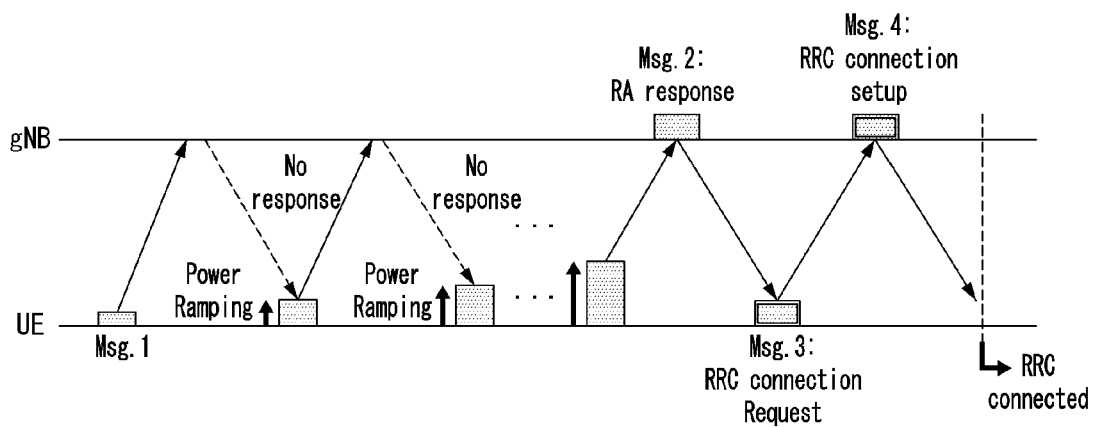

[FIG. 17]
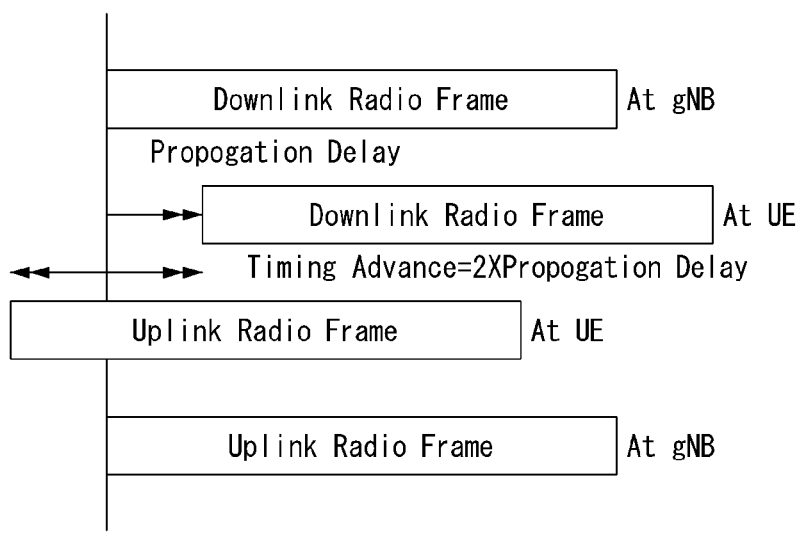
[FIG. 18]
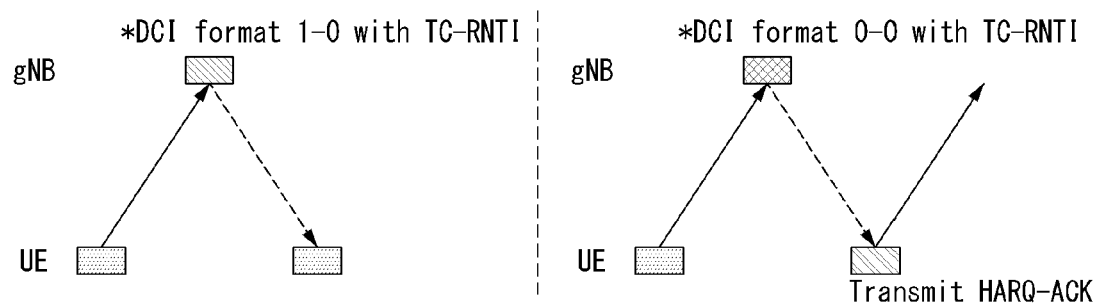

[FIG. 19]
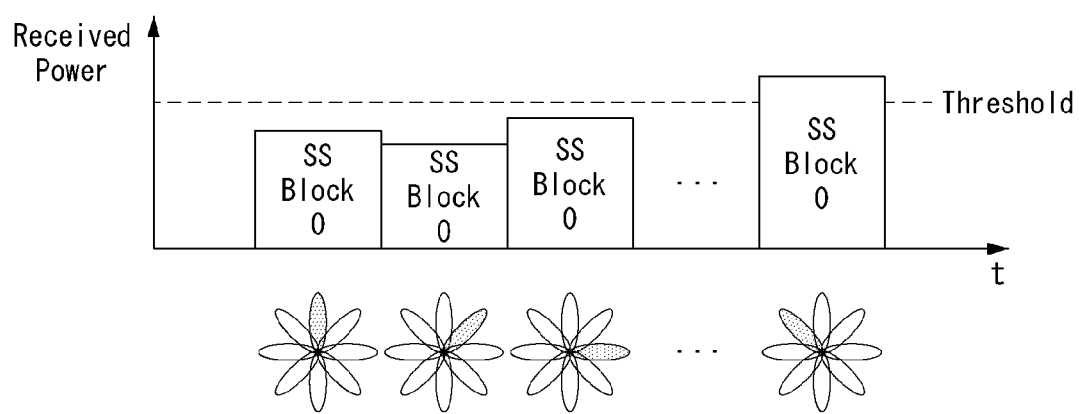
[FIG. 20]
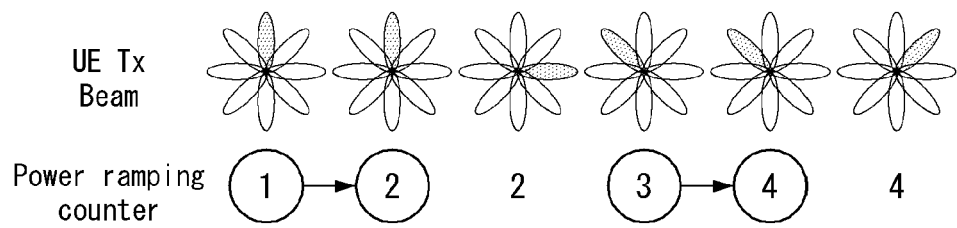

[FIG. 21]
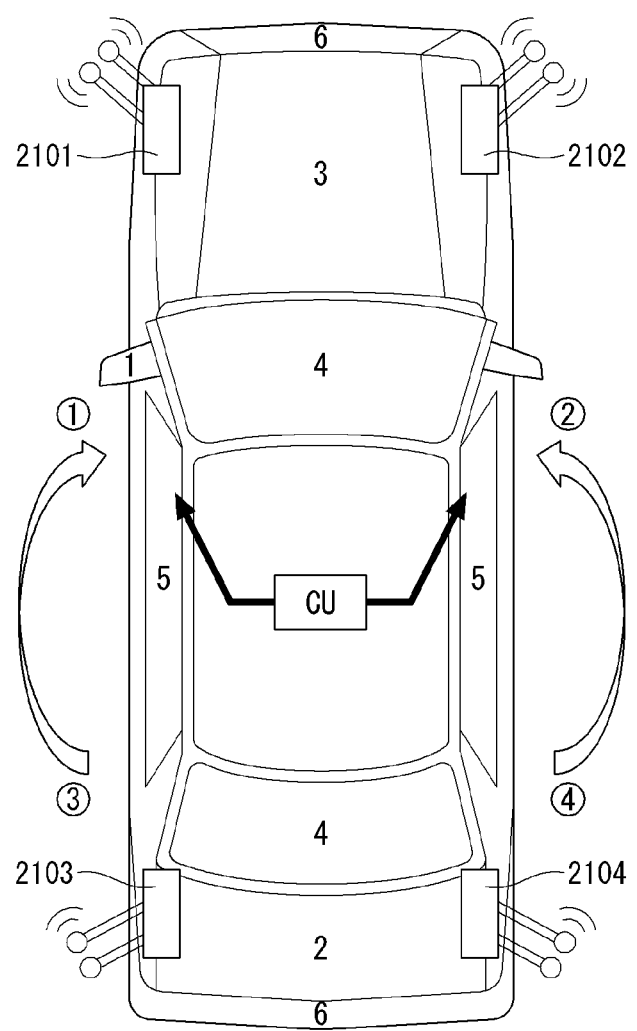

[FIG. 22]
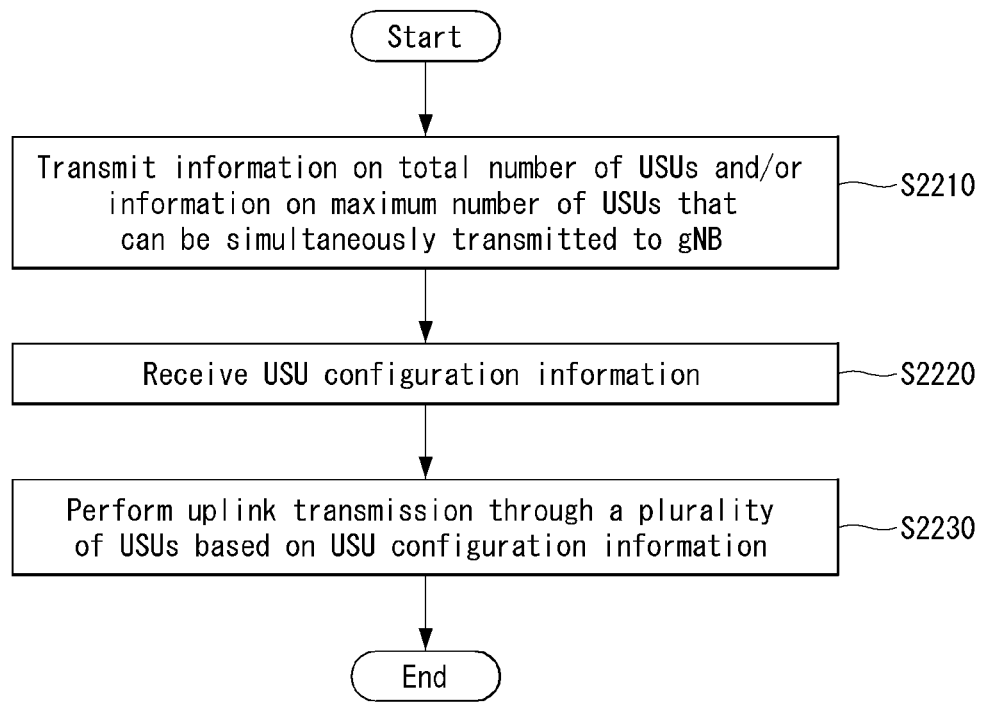

[FIG. 23]
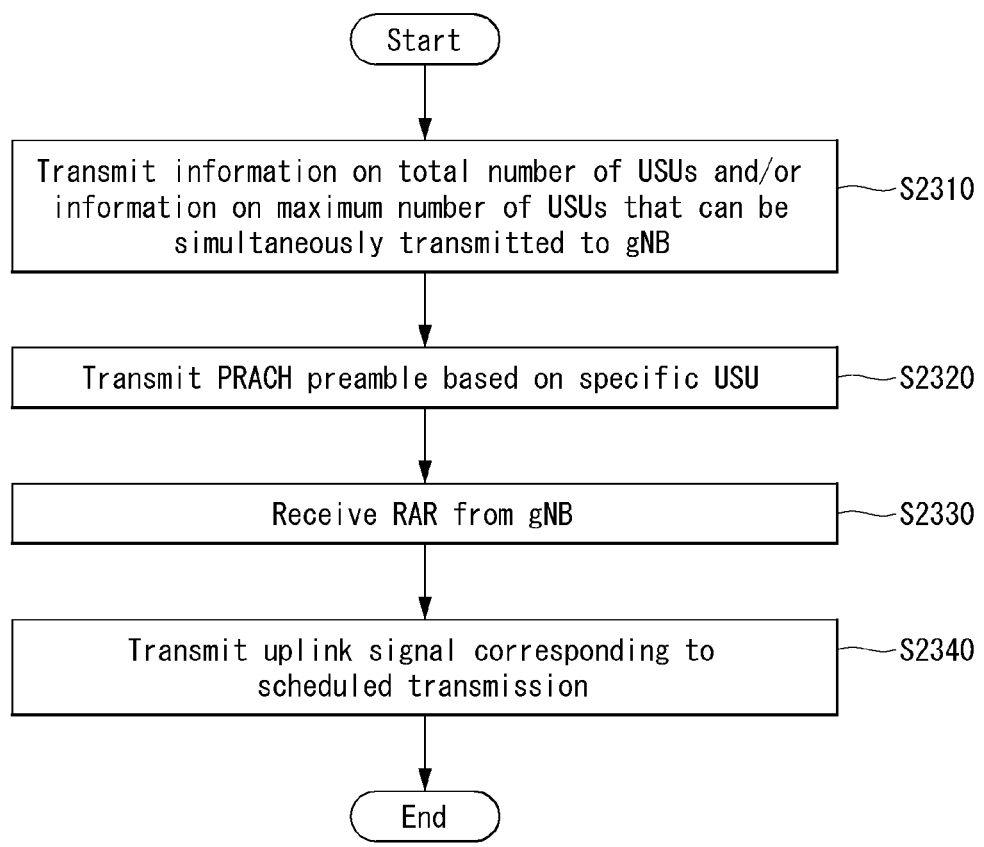

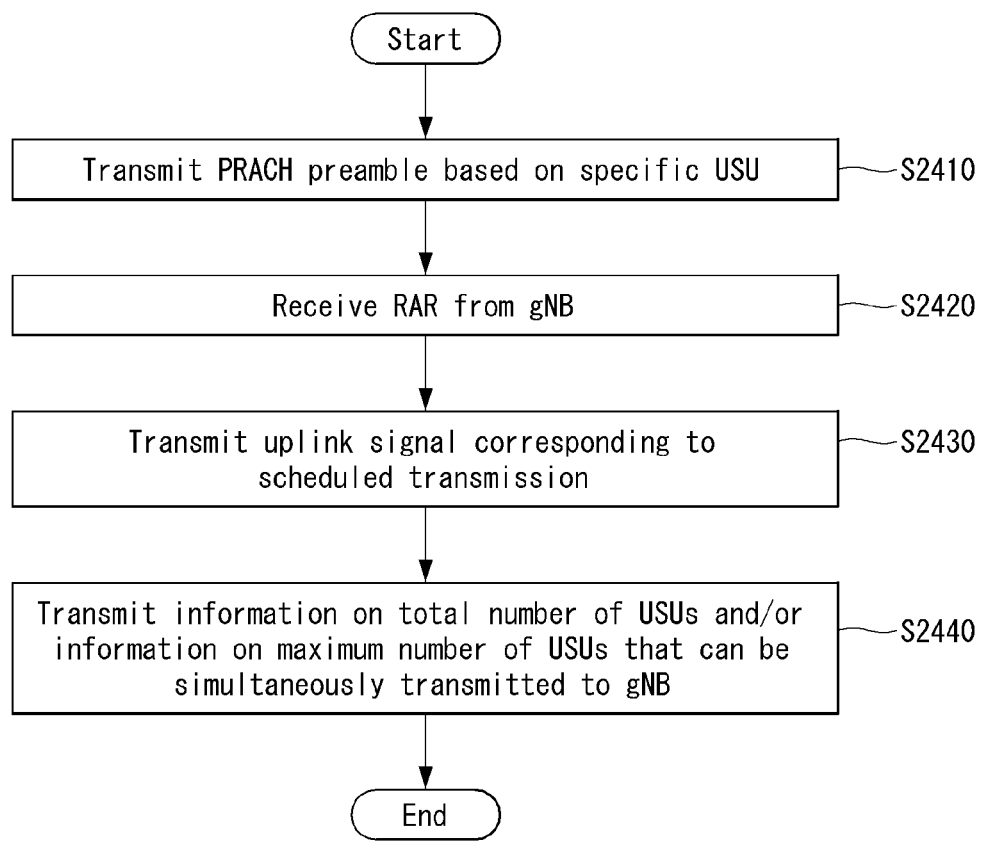
[FIG. 24]

[FIG. 25]
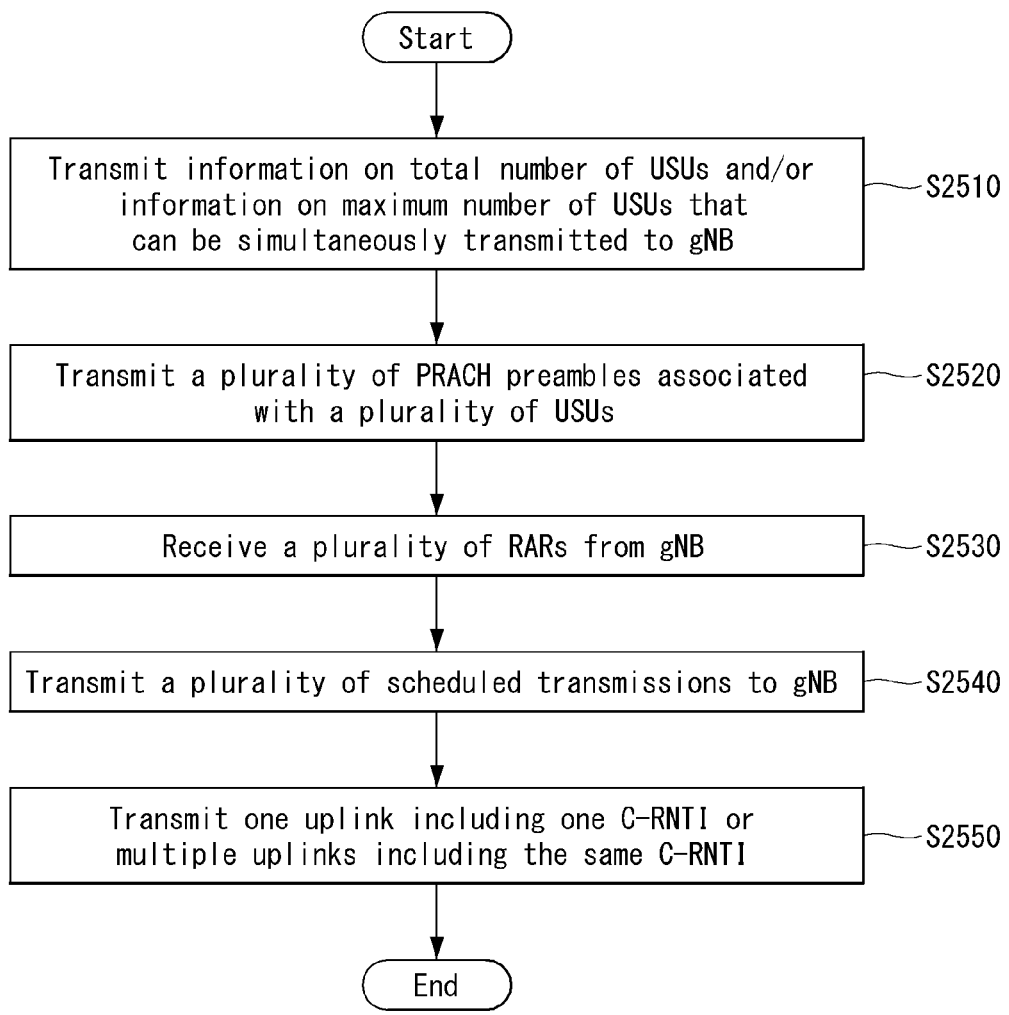

[FIG. 26]
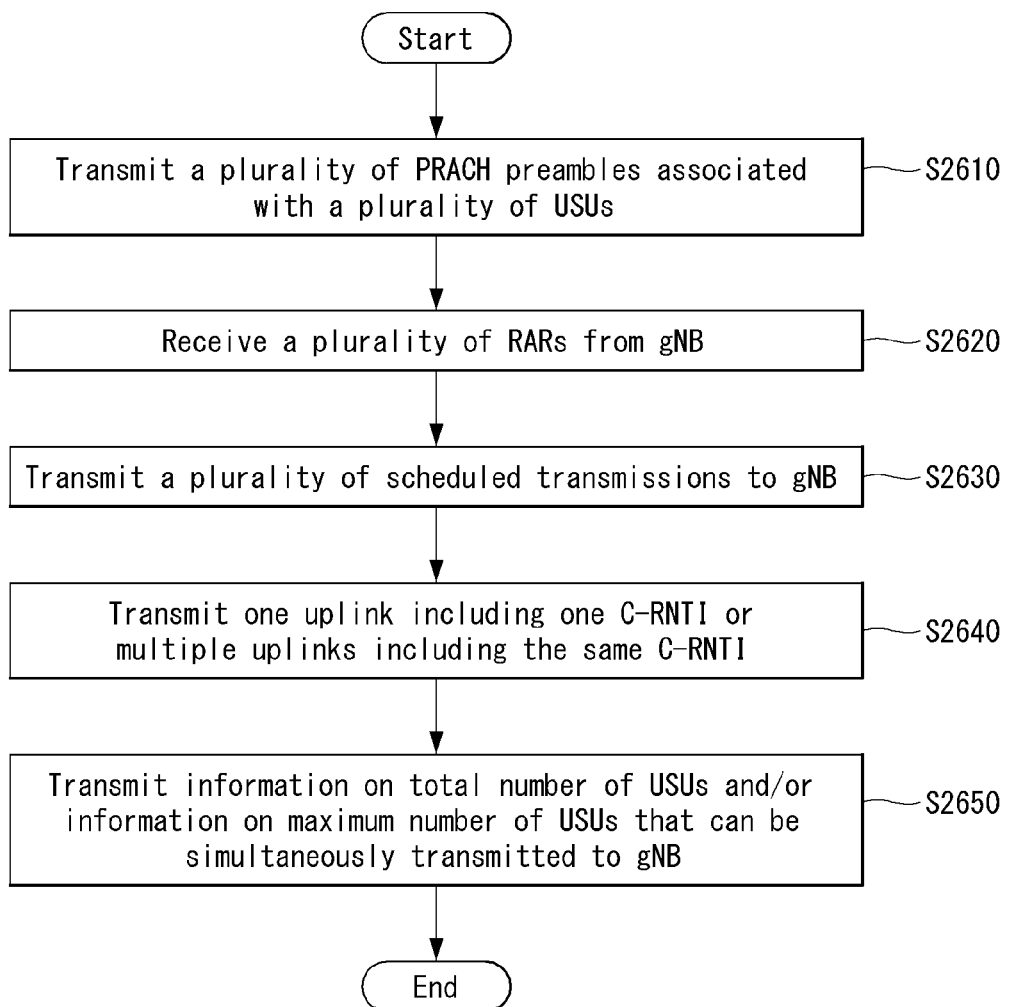

[FIG. 27]
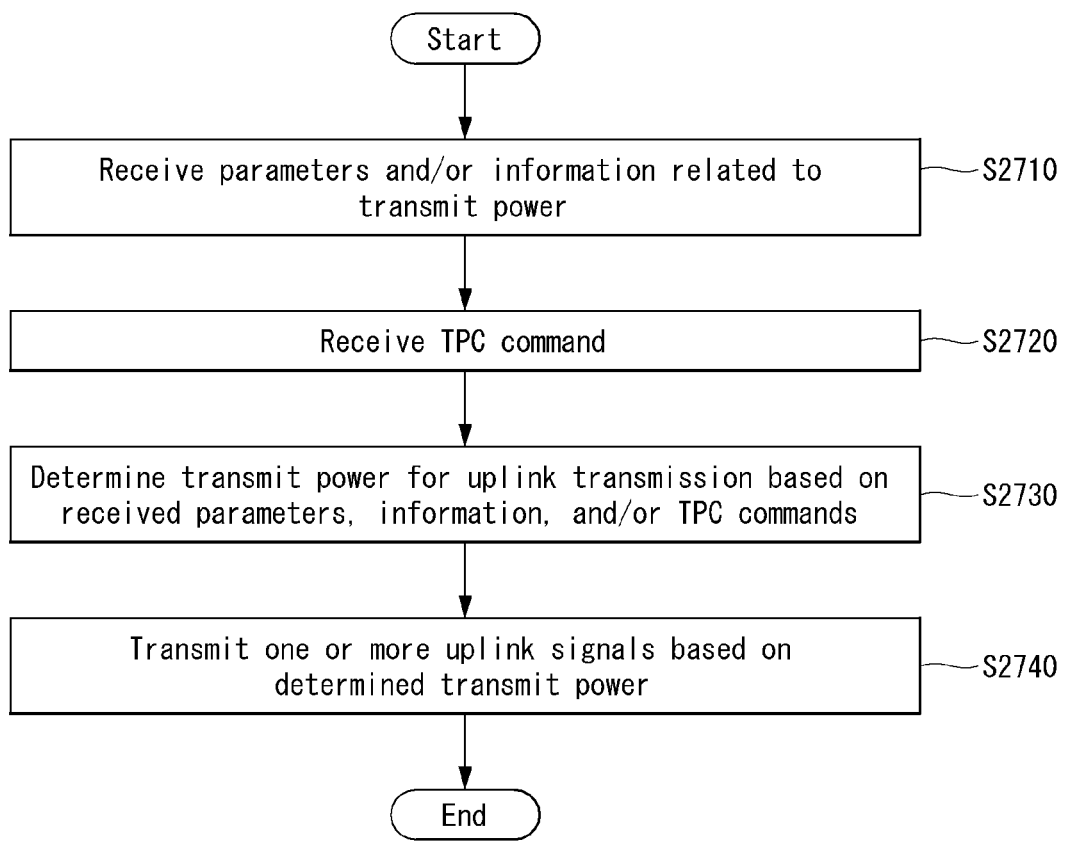

[FIG. 28]
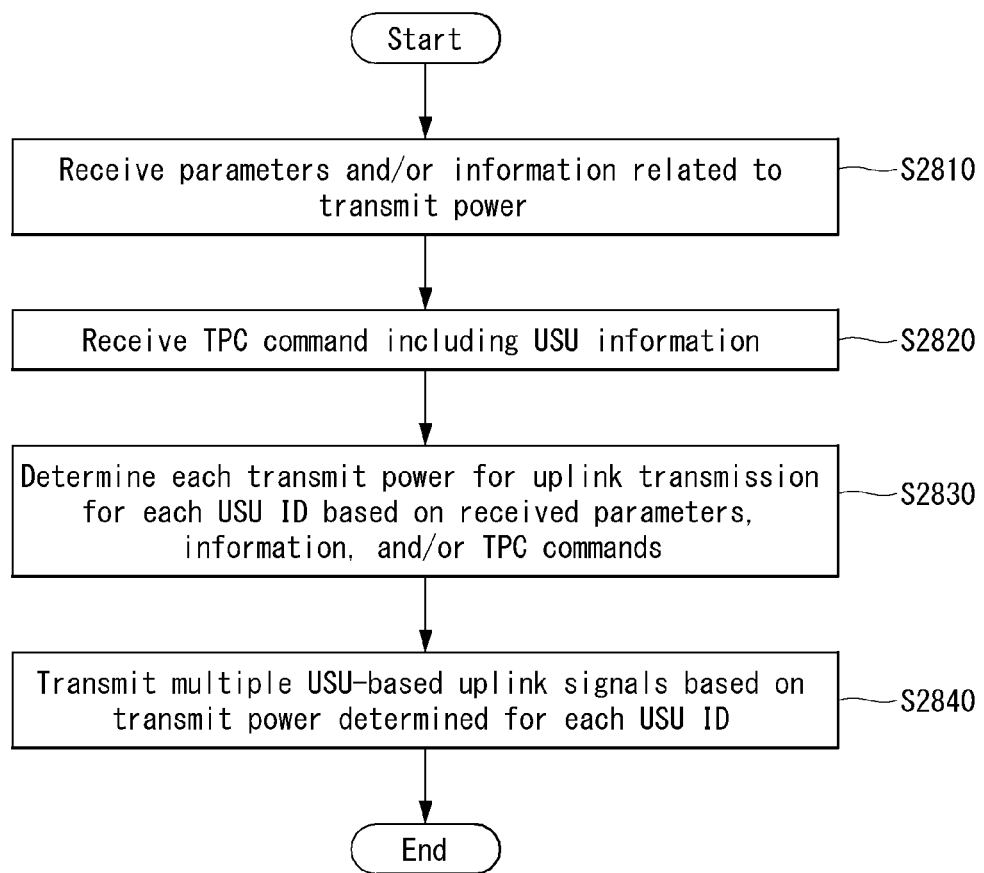

[FIG. 29]
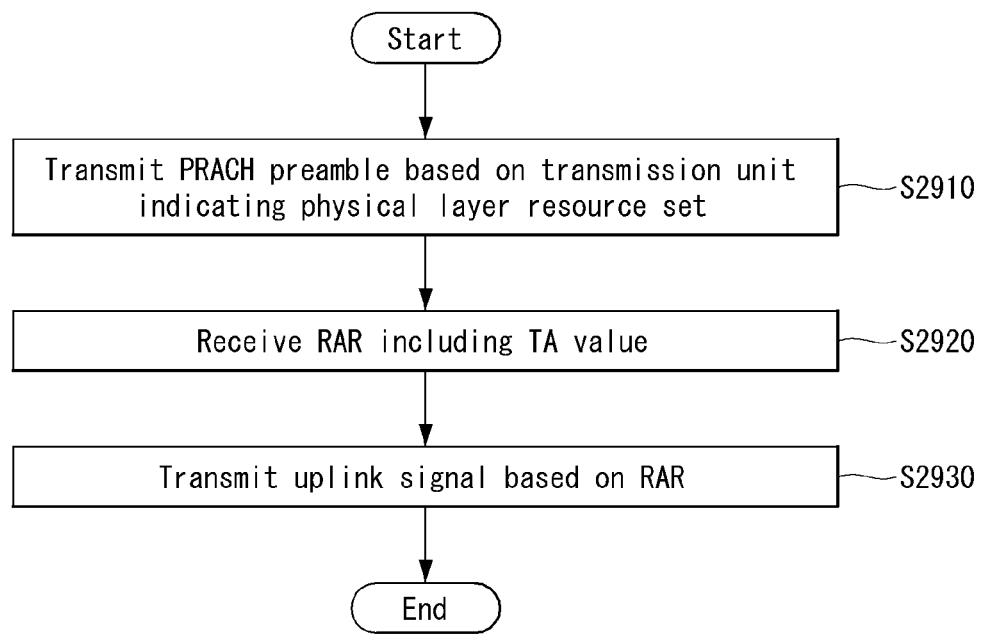

[FIG. 30]
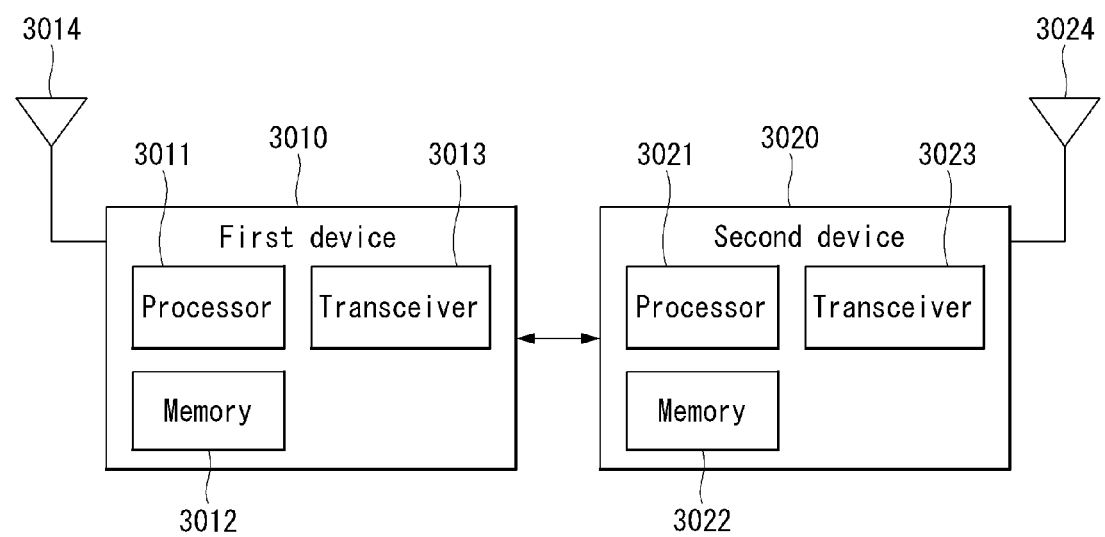

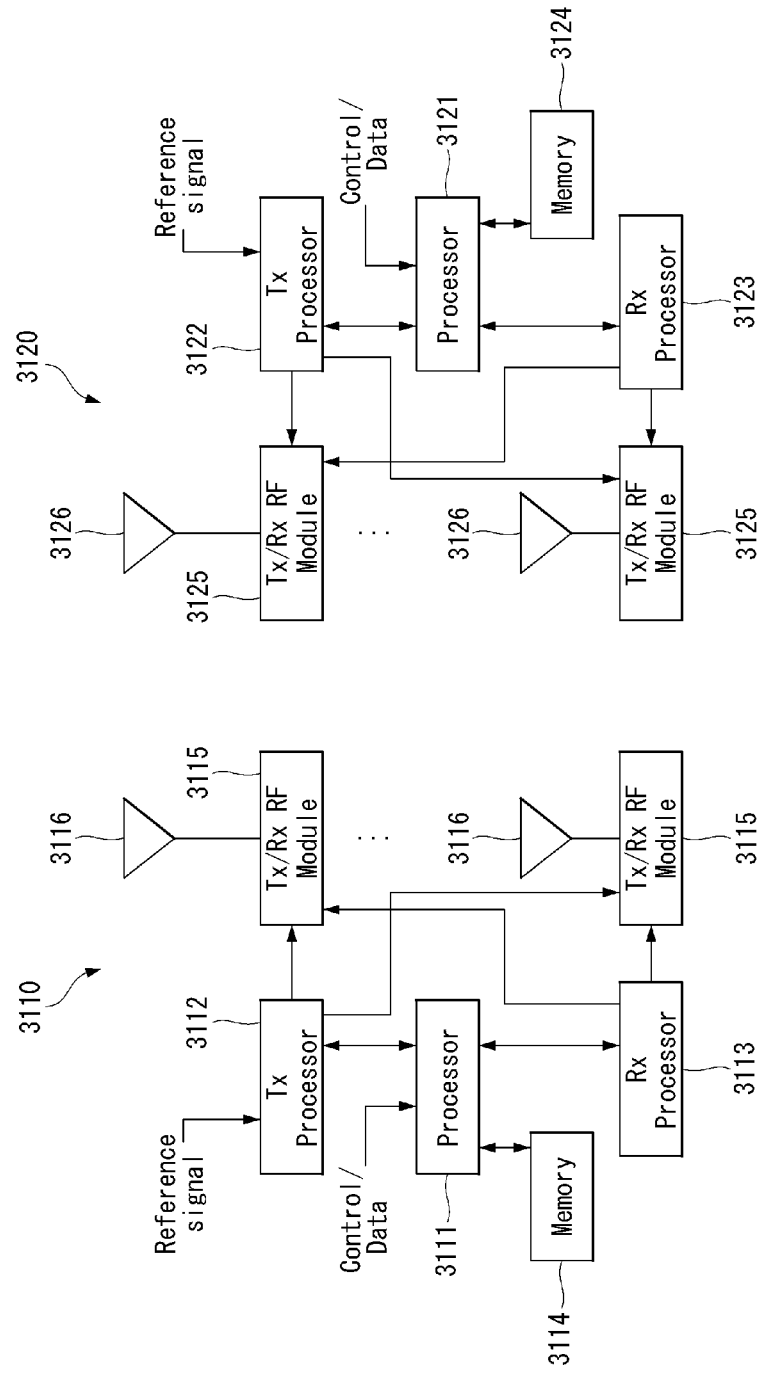
[FIG. 31]

METHOD FOR PERFORMING UPLINK TRANSMISSION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2019/008250, filed on Jul. 4, 2019, which claims the benefit of KR Application No. 10-2018-0077371, filed on Jul. 4, 2018, the contents of which are all hereby incorporated by reference herein in their entirety.

TECHNICAL FIELD

The present disclosure relates to a wireless communication system, and more particularly, to a method for performing uplink transmission and an apparatus supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure provides a method of performing uplink transmission based on a transmission unit for each CC.

The present disclosure further provides a method of configuration a plurality of TA values corresponding to each transmission unit ID for each CC.

Technical problems to be achieved in the present disclosure are not limited to the above-described technical problems, and other technical problems not described will be clearly understood by those of ordinary skill in the technical field to which the present disclosure belongs from the following description.

Technical Solution

A method for transmitting an uplink signal in a wireless communication system, the method performed by a terminal includes transmitting a physical random access channel (PRACH) preamble to a base station based on a transmission unit indicating a physical layer resource set; receiving a random access response (RAR) including a timing advance (TA) value from the base station; and transmitting the uplink signal based on the RAR, wherein transmission unit configuration information for a transmission unit configured in the terminal is transmitted to the base station through the PRACH preamble or the uplink signal.

Further, the method may further include transmitting a first message including at least one of information on the total number of transmission units or information on the maximum number of transmission units that can be simultaneously transmitted to the base station.

Further, the transmission unit configuration information may include at least one of a transmission unit identifier (ID), a PRACH resource associated with a transmission unit, a downlink reference signal (DL RS) associated with a transmission unit, a sounding reference signal (SRS) resource associated with a transmission unit, a physical uplink control channel (PUCCH) resource associated with a transmission unit, or a physical uplink shared channel (PUSCH) resource associated with a transmission unit.

Further, the transmission unit may be a set of an uplink (UL) antenna port, an UL beam, or an UL physical channel resource related to application of a common TA value in one component carrier (CC) or one bandwidth part (BWP).

Further, the first message may further include information on a time or a gap symbol required for switching between transmission units.

Further, the information on the time or gap symbol may indicate at least one symbol or at least one slot.

Further, a terminal for performing uplink transmission in a wireless communication system includes a radio frequency (RF) module; at least one processor; and at least one computer memory operably accessible to the at least one processor and for storing instructions for performing operations when executed by the at least one processor, wherein the operations include transmitting a physical random access channel (PRACH) preamble to a base station based on a transmission unit indicating a physical layer resource set; receiving a random access response (RAR) including a timing advance (TA) value from the base station; and transmitting the uplink signal based on the RAR, wherein transmission unit configuration information for the transmission unit configured in the terminal is transmitted to the base station through the PRACH preamble or the uplink signal.

Advantageous Effects

In the present disclosure, by newly defining the concept of a transmission unit for uplink transmission, there is an effect of performing uplink transmission based on transmission units for each CC.

Further, the present disclosure has an effect of configuration a plurality of TA values corresponding to each transmission unit ID in order to perform uplink transmission based on a plurality of transmission units.

Effects that can be obtained in the present disclosure are not limited to the above-mentioned effects, and other effects not mentioned will be clearly understood by those of ordinary skill in the art from the following description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 is a diagram showing an example of a general system configuration of NR to which a method proposed in this specification may be applied.

FIG. 5 shows a relation between an uplink frame and a downlink frame in a wireless communication system to which a method proposed in this specification may be applied.

FIG. 6 shows an example of a resource grid supplied in a wireless communication system to which a method proposed in this specification may be applied.

FIG. 7 shows examples of a resource grid for each antenna port and numerology to which a method proposed in this specification may be applied.

FIG. 8 shows an example of a block diagram of a transmitter including an analog beamformer and an RF chain.

FIG. 9 shows an example of a block diagram of a transmitting end composed of a digital beamformer and an RF chain.

FIG. 10 shows an example of an analog beam scanning method.

FIG. 11 is a diagram illustrating a comparison of beam scanning application methods.

FIG. 12 illustrates an example of start OFDM symbols.

FIG. 13 illustrates an example of a RACH configuration table.

FIG. 14 is a diagram illustrating an example of a set of a RACH configuration interval and a mapping interval.

FIG. 15 is a diagram illustrating an RACH procedure.

FIG. 16 illustrates an example of an overall RACH procedure.

FIG. 17 is a diagram illustrating an example of a TA.

FIG. 18 illustrates an example of MSG3 retransmission and MSG4 transmission.

FIG. 19 illustrates the concept of a threshold value of an SS block for RACH resource association.

FIG. 20 is a diagram illustrating an example of power ramping count change in an RACH procedure.

FIG. 21 is a diagram illustrating the concept of a USU proposed in the present disclosure.

FIG. 22 is a flowchart illustrating an example of a USU-based uplink transmission method proposed in the present disclosure.

FIG. 23 is a flowchart illustrating another example of a USU-based uplink transmission method proposed in the present disclosure.

FIG. 24 is a flowchart illustrating another example of a USU-based uplink transmission method proposed in the present disclosure.

FIG. 25 is a flowchart illustrating another example of a USU-based uplink transmission method proposed in the present disclosure.

FIG. 26 is a flowchart illustrating another example of a USU-based uplink transmission method proposed in the present disclosure.

FIG. 27 is a flowchart illustrating an example of a power control procedure.

FIG. 28 is a flowchart illustrating an example of a USU-based uplink transmission method through a power control procedure for each USU ID proposed in the present disclosure.

FIG. 29 is a flowchart illustrating a method of operating a terminal for performing uplink transmission proposed in the present disclosure.

FIG. 30 illustrates a wireless communication device to which methods proposed in the present disclosure can be applied according to another embodiment of the present disclosure.

FIG. 31 illustrates another example of a block diagram of a wireless communication device to which methods proposed in the present disclosure can be applied.

MODE FOR DISCLOSURE

Hereinafter, embodiments disclosed in the present disclosure will be described in detail with reference to the accompanying drawings, but the same or similar reference numerals are assigned to the same or similar components, and overlapping descriptions thereof will be omitted. The suffixes "module" and "unit" for components used in the following description are given or used interchangeably in consideration of only the ease of preparation of the disclosure, and do not themselves have a distinct meaning or role. Further, in describing the embodiments disclosed in the present disclosure, when it is determined that a detailed description of related known technologies may obscure the gist of the embodiments disclosed in the present disclosure, a detailed description thereof will be omitted. Further, the accompanying drawings are for easy understanding of the embodiments disclosed in the present disclosure, and the technical idea disclosed in the present disclosure is not limited by the accompanying drawings, and should be understood to include all modifications, equivalents, or substitutes included in the spirit and scope of the present disclosure.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

Hereinafter, examples of 5G use scenarios to which a method proposed in this specification may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure to be described later may be implemented by combining or changing each of the embodiments to satisfy the requirements of 5G described above.

Hereinafter, the present disclosure will be described in detail in connection with the technical field to which the present disclosure to be described later can be applied.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot to which the Present Disclosure is Applied

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving to which the Present Disclosure is Applied

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user behavior or voice speaking, may determine a response based on the obtained intention information, and may perform an operation.

AI+XR to which the Present Disclosure is Applied

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving to which the Present Disclosure is Applied

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR to which the Present Disclosure is Applied

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR to which the Present Disclosure is Applied

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

General System

FIG. 4 illustrates an example of an overall structure of a NR system to which a method proposed by the present specification is applicable.

Referring to FIG. 4, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 5 illustrates a relation between an uplink frame and a downlink frame in a wireless communication system to which a method proposed by the present specification is applicable.

As illustrated in FIG. 5, a UL frame number I from a User Equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ and Table 3 shows the number of OFDM symbols per slot for an extended CP in the numerology µ.

TABLE 2

| | | | Slot configuration | | | |
|---|---|---|---|---|---|---|
| | | 0 | | | 1 | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

FIG. 6 illustrates an example of a resource grid supported in a wireless communication system to which a method proposed by the present specification is applicable.

Referring to FIG. 6, a resource grid is composed of $N_{RB}^{\mu}N_{sc}^{RB}$ subcarriers in a frequency domain, each subframe composed of $14.2\mu$ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 7, one resource grid may be configured per the numerology $\mu$ and an antenna port p.

FIG. 7 illustrates examples of a resource grid per antenna port and numerology to which a method proposed by the present specification is applicable.

Each element of the resource grid for the numerology $\mu$ and the antenna port p is indicated as a resource element, and may be uniquely identified by an index pair (k,l). Herein, $k=0, \ldots, N_{RB}^{\mu}N_{sc}^{RB}-1$ is an index in the frequency domain, and $l=0, \ldots, 2^{\mu}N_{symb}^{(\mu)}-1$ indicates a location of a symbol in a subframe. To indicate a resource element in a slot, the index pair (k,l) is used, where $l=0, \ldots, N_{symb}^{(\mu)}-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel within a slot. For the UL control channel in short duration, transmission over one symbol duration of a slot is supported.

- Short uplink control information (UCI) and data are frequency-division-multiplexed both within a UE and between UEs, at least for the case where physical resource blocks (PRBs) for short UCI and data do not overlap.
- In order to support time division multiplexing (TDM) of a short PUCCH from different UEs in the same slot, a mechanism is supported to inform the UE of whether or not symbol(s) in a slot to transmit the short PUCCH is supported at least above 6 GHz.
- At least following is supported for the PUCCH in 1-symbol duration: 1) UCI and a reference signal (RS) are multiplexed in a given OFDM symbol in a frequency division multiplexing (FDM) manner if the RS is multiplexed, and 2) there is the same subcarrier spacing between downlink (DL)/uplink (UL) data and PUCCH in short-duration in the same slot.
- At least a PUCCH in short-duration spanning 2-symbol duration of a slot is supported. In this instance, there is the same subcarrier spacing between DL/UL data and the PUCCH in short-duration in the same slot.
- At least semi-static configuration, in which a PUCCH resource of a given UE within a slot. i.e., short PUCCHs of different UEs can be time-division multiplexed within a given duration in a slot, is supported.

The PUCCH resource includes a time domain, a frequency domain, and when applicable, a code domain.

The PUCCH in short-duration can span until an end of a slot from UE perspective. In this instance, no explicit gap symbol is necessary after the PUCCH in short-duration.

For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

UCI carried by a long duration UL control channel at least with a low peak to average power ratio (PAPR) design can be transmitted in one slot or multiple slots.

Transmission across multiple slots is allowed for a total duration (e.g. 1 ms) for at least some cases.

In the case of the long duration UL control channel, the TDM between the RS and the UCI is supported for DFT-S-OFDM.

A long UL part of a slot can be used for transmission of PUCCH in long-duration. That is, the PUCCH in long-duration is supported for both a UL-only slot and a slot having the variable number of symbols comprised of a minimum of 4 symbols.

For at least 1 or 2 UCI bits, the UCI can be repeated within N slots (N>1), and the N slots may be adjacent or may not be adjacent in slots where PUCCH in long-duration is allowed.

Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.

Intra-TTI slot frequency-hopping is supported.

DFT-s-OFDM waveform is supported.

Transmit antenna diversity is supported.

Both TDM and FDM between short duration PUCCH and long duration PUCCH are supported at least for different UEs in one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, it should be possible to dynamically indicate (at least in combination with RRC) the timing between data reception and hybrid-ARQ acknowledgement transmission. A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be less than a slot.

Hybrid Beamforming

Existing beamforming technology using multiple antennas may be classified into an analog beamforming scheme and a digital beamforming scheme according to a location to which beamforming weight vector/precoding vector is applied.

The analog beamforming scheme is a beamforming technique applied to an initial multi-antenna structure. The analog beamforming scheme may mean a beamforming technique which branches analog signals subjected to digital signal processing into multiple paths and then applies phase-shift (PS) and power-amplifier (PA) configurations for each path.

For analog beamforming, a structure in which an analog signal derived from a single digital signal is processed by the PA and the PS connected to each antenna is required. In other words, in an analog stage, a complex weight is processed by the PA and the PS.

FIG. 8 illustrates an example of a block diagram of a transmitter consisting of an analog beamformer and an RF chain. FIG. 8 is merely for convenience of explanation and does not limit the scope of the present invention.

In FIG. 8, the RF chain means a processing block for converting a baseband (BB) signal into an analog signal. The analog beamforming scheme determines beam accuracy according to characteristics of elements of the PA and PS and may be suitable for narrowband transmission due to control characteristics of the elements.

Further, since the analog beamforming scheme is configured with a hardware structure in which it is difficult to implement multi-stream transmission, a multiplexing gain for transfer rate enhancement is relatively small. In addition, in this case, beamforming per UE based on orthogonal resource allocation may not be easy.

On the contrary, in the case of digital beamforming scheme, beamforming is performed in a digital stage using a baseband (BB) process in order to maximize diversity and multiplexing gain in a MIMO environment.

FIG. 9 illustrates an example of a block diagram of a transmitter consisting of a digital beamformer and an RF chain. FIG. 9 is merely for convenience of explanation and does not limit the scope of the present invention.

In FIG. 9, beamforming can be performed as precoding is performed in a BB process. Here, the RF chain includes a PA. This is because a complex weight derived for beamforming is directly applied to transmission data in the case of digital beamforming scheme.

Furthermore, since different beamforming can be performed per UE, it is possible to simultaneously support multi-user beamforming. Besides, since independent beamforming can be performed per UE to which orthogonal resources are assigned, scheduling flexibility can be improved and thus a transmitter operation suitable for the system purpose can be performed. In addition, if a technology such as MIMO-OFDM is applied in an environment supporting wideband transmission, independent beamforming can be performed per subcarrier.

Accordingly, the digital beamforming scheme can maximize a maximum transfer rate of a single UE (or user) based on system capacity enhancement and enhanced beam gain. On the basis of the above-described properties, digital beamforming based MIMO scheme has been introduced to existing 3G/4G (e.g., LTE(-A)) system.

In the NR system, a massive MIMO environment in which the number of transmit/receive antennas greatly increases may be considered. In cellular communication, a maximum number of transmit/receive antennas applied to an MIMO environment is generally assumed to be 8. However, as the massive MIMO environment is considered, the number of transmit/receive antennas may increase to tens or hundreds or more.

If the aforementioned digital beamforming scheme is applied in the massive MIMO environment, a transmitter has to perform signal processing on hundreds of antennas through a BB process for digital signal processing. Hence, signal processing complexity may significantly increase, and complexity of hardware implementation may remarkably increase because as many RF chains as the number of antennas are required.

Furthermore, the transmitter needs independent channel estimation for all the antennas. In addition, in case of an FDD system, since the transmitter requires feedback information about a massive MIMO channel composed of all antennas, pilot and/or feedback overhead may considerably increase.

On the other hand, when the aforementioned analog beamforming scheme is applied in the massive MIMO environment, hardware complexity of the transmitter is relatively low.

However, an increase degree of a performance using multiple antennas is very low, and flexibility of resource allocation may decrease. In particular, it is difficult to control the beam per frequency in the wideband transmission.

Accordingly, instead of exclusively selecting only one of the analog beamforming scheme and the digital beamforming scheme in the massive MIMO environment, there is a need for a hybrid transmitter configuration scheme in which an analog beamforming structure and a digital beamforming structure are combined.

Analog Beam Scanning

In general, analog beamforming may be used in a pure analog beamforming transmitter/receiver and a hybrid beamforming transmitter/receiver. In this instance, analog beam scanning can perform estimation for one beam at the same time. Thus, a beam training time required for the beam scanning is proportional to the total number of candidate beams.

As described above, the analog beamforming necessarily requires a beam scanning process in a time domain for beam estimation of the transmitter/receiver. In this instance, an estimation time $T_s$ for all of transmit and receive beams may be represented by the following Equation 2.

$$T_S = t_s \times (K_T \times K_R)$$ [Equation 2]

In Equation 2, is denotes time required to scan one beam, $K_T$ denotes the number of transmit beams, and $K_R$ denotes the number of receive beams.

FIG. 10 shows an example of an analog beam scanning method.

In FIG. 10, it is assumed that the total number $K_T$ of transmit beams is L, and the total number $K_R$ of receive beams is 1. In this case, since the total number of candidate beams is L, L time intervals are required in the time domain.

In other words, since only the estimation of one beam can be performed in a single time interval for analog beam estimation, L time intervals are required to estimate all of L beams $P_1$ to $P_L$ as shown in FIG. 10. The UE feeds back, to the base station, an identifier (ID) of a beam with a highest signal strength after an analog beam estimation procedure is ended. That is, as the number of individual beams increases according to an increase in the number of transmit/receive antennas, a longer training time may be required.

Because the analog beamforming changes a magnitude and a phase angle of a continuous waveform of the time domain after a digital-to-analog converter (DAC), a training interval for an individual beam needs to be secured for the analog beamforming, unlike the digital beamforming. Thus, as a length of the training interval increases, efficiency of the system may decrease (i.e., a loss of the system may increase).

FIG. 11 is a diagram illustrating a comparison of beam scanning application methods. FIG. 11(a) is an Exaustive search method and FIG. 11(b) is a multi-level search method.

The number of search spaces in the Exaustive search method (The No. of search space) is shown in Table 4 below.

TABLE 4

| | Beam-width: 1° | Beam-width: 5° | Beam-width: 10° |
|---|---|---|---|
| 2D | 360 | 72 | 36 |
| 3D | 129,600 | 5,184 | 1,296 |

The number of search spaces in the multi-level search method is shown in Table 5 below.

TABLE 5

| | Beam-width: 1° | | Beam-width: 10° | |
|---|---|---|---|---|
| | Coarse beam | Fine beam | Coarse beam | Fine beam |
| 2D | 8 | 45 | 8 | 4.5 |
| 3D | 64 | 2,025 | 64 | 20.25 |

Regarding the feedback, an Exaustive search method feeds back the best Tx beam ID. In a multi-level search method, the best sector beam ID is fed back for a coarse beam and the best fine beam ID is fed back for a fine beam.

Regarding current industrial and standards, there is no related standard for an Exaustive search method, and there are 802.15.3c and 802.11 ad for a multi-level search method.

More details regarding the beam scanning have been described in [1] J. Wang, Z. Lan, "Beam codebook based beamforming protocol for multi-Gbps millimeter-wave WPAN systems," IEEE J. Select. Areas in Commun., vol. 27, no. 8 [2] J. Kim, AFMolisch, "Adaptive Millimeter-Wave Beam Training for Fast Link Configuration," USC CSI's 30th conference [3] T. Nitsche, "Blind Beam Steering: Removing 60 GHz Beam Steering Overhead,".

Reference Signals in NR

The downlink (DL) physical layer signals of the 3GPP NR system are as follows. For more details, refer to 3GPP TS 38.211 and TS 38.214.

CSI-RS: Signal for DL CSI (channel state information) acquisition and DL beam measurement TRS (tracking RS): Signal for fine time/frequency tracking of UE DL DMRS: RS for PDSCH demodulation DL PT-RS (phase-tracking RS): RS transmitted for compensation of phase noise SSB (synchronization signal block): A resource block composed of a specific number of symbols & resource blocks in time/frequency side consisting of a primary synchronization signal (PSS), a secondary synchronization signal (SSS), and a PBCH (+PBCH DMRS) (Signals in one SSB apply the same beam)

In addition, UL (uplink) physical layer signals of the 3GPP NR system are as follows. Similarly, for more detailed information, refer to 3GPP TS 38.211 and TS 38.214.

SRS: Signal for UL CSI (channel state information) acquisition, UL beam measurement, and antenna port selection UL DMRS: RS for PUSCH demodulation UL PT-RS (phase-tracking RS): RS transmitted for compensation of phase noise of BS PRACH Design and RA Procedure in NR The following description is a brief summary of a PRACH design and random access procedure of a 3GPP NR system, and may differ from the accurate design and simultaneous design of NR.

The accurate design may vary slightly by release and by version, and is described in 3GPP TS 38.211, TS 38.212, TS 38.213, TS 38.214, TS 38.321, and TS 38.331.

Physical Random Access Channel (PRACH) Design

First, the principle of PRACH design will be described.

Supports beam-based PRACH preamble transmission and reception

Supports both FDD and TDD frame structures

Provides dynamic cell range (up to 100 km)

Supports high speed vehicle (e.g., up to 500 km/h)

Supports wide frequency range (e.g., up to 100 GHz)

Next, a sequence for the PRACH preamble will be described.

ZC sequence

:Provides excellent cross correlation characteristics and low PAPR/CM

Sequence of two lengths for the PRACH preamble in NR

:Long preamble sequence (L=839)

(Use Case) use only for LTE coverage and high-speed case/FR1

:Short preamble sequence (L=139)

Multi-beam scenario and TDD frame structure support/preamble is aligned with OFDM symbol boundary/use for both FR1 and FR2

In the case of FR1, it supports subcarrier spacing of 15 kHz and 30 khz.

In the case of FR2, it supports subcarrier spacing of 60 kHz and 120 kHz.

Table 6 illustrates an example of a long sequence-based PRACH preamble, and relates to a long preamble format (LRA=839, subcarrier spacing={1.25, 5}kHz).

TABLE 6

| Format | SCS | TCP (Ts) | TSEQ (Ts) | TGP (Ts) | Use Case |
|---|---|---|---|---|---|
| 0 | 1.25 kHz | 3168k | 24576k | 2976k | LTE coverage |
| 1 | 1.25 kHz | 21024k | 2 · 24576k | 21984k | Large cell, Up to 100 km |
| 2 | 1.25 kHz | 4688k | 4 · 24576k | 19888k | Related |
| 3 | 5 kHz | 3168k | 4 · 6144k | 2976k | High speed |

Table 7 illustrates an example of a short sequence-based PRACH preamble, and relates to short preamble formats (LRA=139, subcarrier spacing={15, 30, 60, 120} kHz).

TABLE 7

| Format | | # of Sequence | TCP | TSEQ | TGP | Path profile (Ts) | Path profile (us) | Maximum Cell radius (meter) |
|---|---|---|---|---|---|---|---|---|
| A | 1 | 2 | $288k \cdot 2^{-u}$ | $2 \cdot 2048k \cdot 2^{-u}$ | $0k \cdot 2^{-u}$ | 96 | 3.13 | 938 |
|   | 2 | 4 | $576k \cdot 2^{-u}$ | $4 \cdot 2048k \cdot 2^{-u}$ | $0k \cdot 2^{-u}$ | 144 | 4.69 | 2,109 |
|   | 3 | 6 | $864k \cdot 2^{-u}$ | $6 \cdot 2048k \cdot 2^{-u}$ | $0k \cdot 2^{-u}$ | 144 | 4.69 | 3,516 |
| B | 1 | 2 | $216k \cdot 2^{-u}$ | $2 \cdot 2048k \cdot 2^{-u}$ | $72k \cdot 2^{-u}$ | 72 | 3.13 | 469 |
|   | 2 | 4 | $360k \cdot 2^{-u}$ | $4 \cdot 2048k \cdot 2^{-u}$ | $216k \cdot 2^{-u}$ | 144 | 4.69 | 1,055 |
|   | 3 | 6 | $504k \cdot 2^{-u}$ | $6 \cdot 2048k \cdot 2^{-u}$ | $360k \cdot 2^{-u}$ | 144 | 4.69 | 1,758 |
|   | 4 | 12 | $936k \cdot 2^{-u}$ | $12 \cdot 2048k \cdot 2^{-u}$ | $792k \cdot 2^{-u}$ | 144 | 4.69 | 3,867 |
| C | 0 | 1 | $1240k \cdot 2^{-u}$ | $2048k \cdot 2^{-u}$ | $1096k \cdot 2^{-u}$ | 144 | 4.69 | 5300 |
|   | 2 | 4 | $2048k \cdot 2^{-u}$ | $4 \cdot 2048k \cdot 2^{-u}$ | $2912k \cdot 2^{-u}$ | 144 | 4.69 | 9200 |

Next, an RACH slot will be described.

The RACH slot includes one or more RACH occasion(s).

A slot duration is 1 ms for {1.25 kHz, 5 kHz} subcarrier spacing, and has a scalable duration (i.e., 1 ms, 0.5 ms, 0.25 ms, 0.125 ms) for {15 kHz, 30 kHz, 60 kHz, 120 kHz} subcarrier spacing.

For short preamble formats, a start OFDM symbol index in the RACH slot has {0,2,x} values.

FIG. 12 illustrates an example of start OFDM symbols. Specifically, FIG. 12a illustrates a case where the start OFDM symbol is '0', and FIG. 12b illustrates a case where the start OFDM symbol is '2'.

Next, a RACH configuration table will be described.

A number of tables may be defined according to a frequency range and duplex scheme.

FDD and FR1 (for both long preamble and short preamble formats)

TDD and FR1 (for both long preamble and short preamble formats)

TDD and FR2 (only in a short preamble format)

FIG. 13 illustrates an example of a RACH configuration table.

The association between SSB and RACH occasions will be described.

Time interval from SSB to RO association

A smallest value in a set determined by the RACH configuration.

All of the actually transmitted SSBs may be mapped to ROs within the time interval at least once.

Table 8 illustrates an example of a RACH configuration interval and a mapping interval set, and FIG. 14 is a diagram illustrating an example of a RACH configuration interval and a mapping interval set.

TABLE 8

| RACH configuration period (ms) | Mapping Period set (# of RACH configuration period) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

Random Access (RA) Procedure

RA may be triggered by several events.

Initial access in RRC_IDLE

RRC connection re-establishment procedure

Handover

When an UL synchronization status is asynchronous, DL or UL data arrives during RRC_CONNECTED Transition in RRC_INACTIVE Request other system information (SI)

Beam failure recovery

Two types of RACH procedures in NR will be described with reference to FIG. 15.

FIG. 15a illustrates a contention based RACH procedure, and FIG. 15b illustrates a contention free RACH procedure.

FIG. 16 illustrates an example of an overall RACH procedure.

First, MSG1 transmission will be described.

Subcarrier spacing for MSG1 is configured in an RACH configuration, and a handover command is provided for an RA procedure without contention for handover.

Preamble indices for contention based random access (CBRA) and contention free random access (CFRA) are continuously mapped to one SSB in one RACH transmission occasion.

CBRA

: The association between an SS block (SSB) and a subset of RACH resources and/or preamble indices within an SS burst set is configured by a parameter set in RMSI.

CFRA

: The UE may be configured to transmit multiple MSG1s through a dedicated multiple RACH transmission occasion in a time domain before the end of a monitored RAR window.

The association between the CFRA preamble and SSB is re-configured through UE-specific RRC.

Next, a random access response (MSG2) configuration will be described.

Subcarrier spacing (SCS) for MSG2 is the same as SCS of the remaining minimum SI (RMSI).

A contention-free RA procedure for handover is provided in a handover command.

MSG2 is transmitted within a UE minimum DL BW.

The size of the RAR window is the same for all RACH occasions and is configured in RMSI.

Maximum window size: depends on the worst gNB delay after Msg1 reception including processing delay, scheduling delay, etc.

Minimum window size: depends on duration of Msg2 or CORESET and scheduling delay.

Next, a timing advance (TA) command in MSG2 will be described.

It is used for controlling uplink signal transmission timing.

First, in the case of LTE,

TA resolution is 16 Ts (Ts=1/(2048×15000)).

A TA range is 1282×TA step size to 667.66.→100.16

In RAR, the timing advance (TA) has a value from 0 to 1,282 and is configured with 11 bits.

In the case of NR,

It is used in very long coverage (150 Km to 300 Km) in TR38.913.

TA increases by 2,564 or 3,846 TA_step (12 its).

FIG. 17 is a diagram illustrating an example of a TA.

RA-RNTI

RA_RNTI is determined by transmitting timing of a PRACH Preamble by the UE.

That is, RA_RNTI may be determined by the following equation.

$$RA\_RNTI = 1 + s\_id + 14*t\_id + 14*X*f\_id + 14*X*Y*ul\_carrier\_id \quad \text{[Equation 3]}$$

In Equation 3, s_id represents a first OFDM symbol index (0≤s_id<14), t_id represents a first slot index in a system frame (0≤t_id<X), X is 80 fixed for 120 kHz SCS, f_id represents a frequency domain index (0≤f_id<Y), Y is 8 fixed for the maximum #n of FDMed RO, and ul_carrier_id represents an indication of a UL carrier (0: normal, 1: SUL).

A minimum gap between MSG2 and MSG3 is duration of N1+duration of N2+L2+TA.

Here, N1 and N2 are front loaded+additional DMRS and UE capability, L2 is MAC processing latency (500 us), and TA is the same as a maximum timing advance value.

When MSG2 does not include a response to a transmitted preamble sequence,

A new preamble sequence is transmitted after duration of N1+Δnew+L2.

Table 9 illustrates an example of DCI format 1-0 having RA-RNTI.

TABLE 9

| Field | Bits | Comment |
| --- | --- | --- |
| Identifier for DCI formats | 1 | Reserved |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Reserved |
| HARQ process number | 4 | Reserved |
| Downlink assignment index | 2 | Reserved |
| TPC command for scheduled PUCCH | 2 | Reserved |
| PUCCH resource indicator | 3 | Reserved |
| PDSCH-to-HARQ feedback timing indicator | 3 | Reserved |

Next, Message3 will be described.

MSG3 is scheduled by uplink grant in RAR.

The MSG3 is transmitted after a minimum time interval from the end of MSG2.

Transmit power of MSG3 is configured in MSG2.

The SCS for MSG3 is configured in RMSI including 1 bit (independently from the SCS for MSG1).

MSG3 includes UE-Identity and establishment cause.

First, for UE-Identity, IMSI is transmitted in a message when it is first attached to a network.

When the UE is previously attached, S-TMSI is included in the message.

The establishment cause may include emergency, MO-signaling, MO-data, MT-access, high-priority access, and the like.

Table 10 illustrates an example of DCI format 0-0 having TC-RNTI for MSG3 retransmission.

TABLE 10

| Field | Bits | Comment |
| --- | --- | --- |
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

An MSG4 configuration will be described.

The MSG4 configuration is limited within a UE minimum DL BW.

The SCS for MSG4 is the same as numerology for RMSI and MSG2.

A minimum gap between MSG4 and the start of HARQ-ACK is N1+L2.

Here, N1 denotes a UE processing time, and L2 denotes a MAC layer processing time.

The distinction between retransmission order of MSG 3 and MSG4 will be described.

MSG3 retransmission: DCI format 0-0 having TC-RNTI
MSG4: DCI format 1-0 having TC-RNTI FIG. 18 illustrates an example of MSG3 retransmission and MSG4 transmission.

Table 11 illustrates an example of DCI format 1-0 having TC-RNTI for MSG4.

TABLE 11

| Field | Bits | Comment |
| --- | --- | --- |
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use UE-capability-independent MCS table |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

Hereinafter, a random access procedure of an NR system will be described in more detail.

The UE may transmit PRACH preamble in UL as Msg1 of the random access procedure.

Random access preamble sequences, of two different lengths are supported. Long sequence length 839 is applied with subcarrier spacings of 1.25 and 5 kHz and short sequence length 139 is applied with sub-carrier spacings 15, 30, 60 and 120 kHz. Long sequences support unrestricted sets and restricted sets of Type A and Type B, while short sequences support unrestricted sets only.

Multiple RACH preamble formats are defined with one or more RACH OFDM symbols, and different cyclic prefix and guard time. The PRACH preamble configuration to use is provided to the UE in the system information.

When there is no response to the Msg1, the UE may retransmit the PRACH preamble with power rampling within the prescribed number of times. The UE calculates the PRACH transmit power for the retransmission of the preamble based on the most recent estimate pathloss and power ramping counter. If the UE conducts beam switching, the counter of power ramping remains unchanged.

The system information informs the UE of the association between the SS blocks and the RACH resources.

FIG. 19 shows the concept of threshold of the SS block for RACH resource association.

Referring to FIG. 19, the threshold of the SS block for RACH resource association is based on the RSRP and network configurable. Transmission or retransmission of RACH preamble is based on the SS blocks that satisfy the threshold.

When the UE receives random access response on DL-SCH, the DL-SCH may provide timing alignment information, RA-preamble ID, initial UL grant and Temporary C-RNTI.

Based on this information, the UE may transmit UL transmission on UL-SCH as Msg3 of the random access procedure. Msg3 can include RRC connection request and UE identifier.

In response to the Msg3, the network may transmit Msg4, which can be treated as contention resolution message on DL. By receiving this, the UE may enter into RRC connected state.

Specific explanation for each of the steps is as follows:

Prior to initiation of the physical random access procedure, Layer 1 shall receive from higher layers a set of SS/PBCH block indexes and shall provide to higher layers a corresponding set of RSRP measurements.

Prior to initiation of the physical random access procedure, Layer 1 shall receive the following information from the higher layers:

Configuration of physical random access channel (PRACH) transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the L1 random access procedure encompasses the transmission of random access preamble (Msg1) in a PRACH, random access response (RAR) message with a PDCCH/PDSCH (Msg2), and when applicable, the transmission of Msg3 PUSCH, and PDSCH for contention resolution.

If a random access procedure is initiated by a "PDCCH order" to the UE, a random access preamble transmission is with a same subcarrier spacing as a random access preamble transmission initiated by higher layers.

If a UE is configured with two UL carriers for a serving cell and the UE detects a "PDCCH order", the UE uses the UL/SUL indicator field value from the detected "PDCCH order" to determine the UL carrier for the corresponding random access preamble transmission.

Regarding the random access preamble transmission step, physical random access procedure is triggered upon request of a PRACH transmission by higher layers or by a PDCCH order. A configuration by higher layers for a PRACH transmission includes the following:

A configuration for PRACH transmission.

A preamble index, a preamble subcarrier spacing, $P_{PRACH,target}$, a corresponding RA-RNTI, and a PRACH resource.

A preamble is transmitted using the selected PRACH format with transmission power $P_{PRACH,b,f,c}(i)$, on the indicated PRACH resource.

A UE is provided a number of SS/PBCH blocks associated with one PRACH occasion by the value of higher layer parameter SSB-perRACH-Occasion. If the value of SSB-perRACH-Occasion is smaller than one, one SS/PBCH block is mapped to 1/SSB-per-rach-occasion consecutive PRACH occasions.

The UE is provided a number of preambles per SS/PBCH block by the value of higher layer parameter cb-preamblePerSSB and the UE determines a total number of preambles per SSB per PRACH occasion as the multiple of the value of SSB-perRACH-Occasion and the value of cb-preamblePerSSB.

SS/PBCH block indexes are mapped to PRACH occasions in the following order.

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

The period, starting from frame 0, for the mapping of SS/PBCH blocks to PRACH occasions is the smallest of {1, 2, 4} PRACH configuration periods that is larger than or equal to $\lceil N_{Tx}^{SSB}/N_{PRACH\ period}^{SSB} \rceil$, where the UE obtains $N_{Tx}^{SSB}$ from higher layer parameter SSB-transmitted-SIB1 and $N_{PRACH\ period}^{SSB}$ is the number of SS/PBCH blocks that can be mapped to one PRACH configuration period.

If a random access procedure is initiated by a PDCCH order, the UE shall, if requested by higher layers, transmit a PRACH in the first available PRACH occasion for which a time between the last symbol of the PDCCH order reception and the first symbol of the PRACH transmission is larger than or equal to $N_{T,2}+\Delta_{BWPSwitching}+\Delta_{Delay}$ msec where $N_{T,2}$ is a time duration of $N_2$ symbols corresponding to a PUSCH preparation time for PUSCH processing capability 1, $\Delta_{BWPSwitching}$ is pre-defined, and $\Delta_{Delay}>0$.

In response to a PRACH transmission, a UE attempts to detect a PDCCH with a corresponding RA-RNTI during a window controlled by higher layers. The window starts at the first symbol of the earliest control resource set the UE is configured for Type1-PDCCH common search space that is at least $\lceil (\Delta \cdot N_{slot}^{subframe,\mu} \cdot N_{symb}^{slot})/T_{sf} \rceil$ symbols after the last symbol of the preamble sequence transmission. The length of the window in number of slots, based on the subcarrier spacing for Type0-PDCCH common search space is provided by higher layer parameter rar-WindowLength.

If a UE detects the PDCCH with the corresponding RA-RNTI and a corresponding PDSCH that includes a DL-SCH transport block within the window, the UE passes the transport block to higher layers.

The higher layers parse the transport block for a random access preamble identity (RAPID) associated with the PRACH transmission. If the higher layers identify the RAPID in RAR message(s) of the DL-SCH transport block, the higher layers indicate an uplink grant to the physical layer. This is referred to as random access response (RAR) UL grant in the physical layer. If the higher layers do not identify the RAPID associated with the PRACH transmission, the higher layers can indicate to the physical layer to transmit a PRACH.

A minimum time between the last symbol of the PDSCH reception and the first symbol of the PRACH transmission is equal to $N_{T,1}+\Delta_{new}+0.5$ msec where $N_{T,1}$ is a time duration of $N_1$ symbols corresponding to a PDSCH reception time for PDSCH processing capability 1 when additional PDSCH DM-RS is configured and $\Delta_{new} \geq 0$.

A UE shall receive the PDCCH with the corresponding RA-RNTI and the corresponding PDSCH that includes the DL-SCH transport block with the same DM-RS antenna port quasi co-location properties, as for a detected SS/PBCH block or a received CSI-RS. If the UE attempts to detect the PDCCH with the corresponding RA-RNTI in response to a PRACH transmission initiated by a PDCCH order, the UE assumes that the PDCCH and the PDCCH order have same DM-RS antenna port quasi co-location properties.

A RAR UL grant schedules a PUSCH transmission from the UE (Msg3 PUSCH). The contents of the RAR UL grant, starting with the MSB and ending with the LSB, are given in Table 12. Table 12 shows random access response grant content field size.

TABLE 12

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reseved bits | 3 |

The Msg3 PUSCH frequency resource allocation is for uplink resource allocation type 1. In case of frequency hopping, based on the indication of the frequency hopping flag field, the first one or two bits, $N_{UL,hop}$ bits, of the Msg3 PUSCH frequency resource allocation field are used as hopping information bits as described in following [Table I.5].

The MCS is determined from the first sixteen indices of the applicable MCS index table for PUSCH. The TPC command $\delta_{msg2,b,f,c}$ is used for setting the power of the Msg3 PUSCH, and is interpreted according to Table 13. Table 13 shows TPC command $\delta_{msg2,b,f,c}$ for Msg3 PUSCH.

TABLE 13

| TPC Command | Value(in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In non-contention based random access procedure, the CSI request field is interpreted to determine whether an aperiodic CSI report is included in the corresponding PUSCH transmission. In contention based random access procedure, the CSI request field is reserved.

Unless a UE is configured a subcarrier spacing, the UE receives subsequent PDSCH using same subcarrier spacing as for the PDSCH reception providing the RAR message.

If a UE does not detect the PDCCH with a corresponding RA-RNTI and a corresponding DL-SCH transport block within the window, the UE performs the procedure for random access response reception failure.

For example, the UE may perform power ramping for retransmission of the Random Access Preamble based on a power ramping counter. However, the power ramping counter remains unchanged if a UE conducts beam switching in the PRACH retransmissions as shown in FIG. 20 below.

Referring to FIG. 20, the UE may increase the power ramping counter by 1, when the UE retransmit the random access preamble for the same beam. However, when the beam had been changed, the power ramping counter remains unchanged.

Regarding Msg3 PUSCH transmission, higher layer parameter msg3-tp indicates to a UE whether or not the UE shall apply transform precoding, for an Msg3 PUSCH transmission. If the UE applies transform precoding to an Msg3 PUSCH transmission with frequency hopping, the frequency offset for the second hop is given in Table 14. Table 14 shows frequency offset for second hop for Msg3 PUSCH transmission with frequency hopping.

TABLE 14

| Number of PRBs in initial active UL BWP | Value of $N_{UL, hop}$ Hopping Bits | Frequency offset for 2nd hop |
|---|---|---|
| $N_{BWP}^{size} < 50$ | 0 | $N_{BWP}^{size}/2$ |
| | 1 | $N_{BWP}^{size}/4$ |
| $N_{BWP}^{size} \geq 50$ | 00 | $N_{BWP}^{size}/2$ |
| | 01 | $N_{BWP}^{size}/4$ |
| | 10 | $-N_{BWP}^{size}/4$ |
| | 11 | Reserved |

The subcarrier spacing for Msg3 PUSCH transmission is provided by higher layer parameter msg3-scs. A UE shall transmit PRACH and Msg3 PUSCH on a same uplink carrier of the same serving cell. An UL BWP for Msg3 PUSCH transmission is indicated by SystemInformation-BlockType1.

A minimum time between the last symbol of a PDSCH reception conveying a RAR and the first symbol of a corresponding Msg3 PUSCH transmission scheduled by the RAR in the PDSCH for a UE when the PDSCH and the PUSCH have a same subcarrier spacing is equal to $N_{T,1}+N_{T,2}+N_{TA,max}+0.5$ msec. $N_{T,1}$ is a time duration of $N_1$ symbols corresponding to a PDSCH reception time for PDSCH processing capability 1 when additional PDSCH DM-RS is configured, $N_{T,2}$ is a time duration of $N_2$ symbols corresponding to a PUSCH preparation time for PUSCH processing capability 1, and $N_{TA,max}$ is the maximum timing adjustment value that can be provided by the TA command field in the RAR.

In response to an Msg3 PUSCH transmission when a UE has not been provided with a C-RNTI, the UE attempts to detect a PDCCH with a corresponding TC-RNTI scheduling a PDSCH that includes a UE contention resolution identity. In response to the PDSCH reception with the UE contention resolution identity, the UE transmits HARQ-ACK information in a PUCCH. A minimum time between the last symbol of the PDSCH reception and the first symbol of the corresponding HARQ-ACK transmission is equal to $N_{T,1}+0.5$ msec. $N_{T,1}$ is a time duration of $N_1$ symbols corresponding to a PDSCH reception time for PDSCH processing capability 1 when additional PDSCH DM-RS is configured.

In current/future wireless communication systems, various UE types need to be considered and supported.

A current LTE system is optimized for single panel UEs.

Multi-panel UEs are supported in a very limited range of Rel-15 NR system.

In Rel-15 NR, multiple SRS resources may be configured in the UE. When the multiple SRS resources are configured in the UE, the UE may transmit a set of SRS antenna ports configured in an SRS resource from one panel and a set of another SRS ports configured in another SRS resource from another panel.

For non-codebook based uplink transmission, a set of SRS resources may be transmitted from the same panel by applying different beams, and another set of SRS resources may be transmitted from other panels by applying different beams. Here, only one port (i.e., port-wise) SRS beamforming is applied to each SRS resource. That is, each SRS resource/port corresponds to a layer candidate to be applied to PUSCH transmission in the future.

In summary, the UE may use different transmission panels for transmission of different (sets of) SRS resources.

After receiving and comparing SRS ports in a gNB, the gNB selects one of the configured SRS resources, and transmits an SRS resource indicator (SRI) together with a transmit precoding matrix indicator (TPMI) and a transmit rank indicator (TRI) for codebook-based PUSCH transmission.

When the UE accurately receives a command, the UE needs to use a panel indicated through the SRI for PUSCH transmission. For non-codebook based UL transmission, the gNB only transmits an SRI(s), and the UE needs to apply a layer selected from the panel.

When Rel-15 codebook (CB) based UL transmission is applied to multi-panel UEs, it has the following limitations.

Different number of transmission antenna ports per panel are not supported

For PUSCH transmission, simultaneous use of multi-panels is disabled or limitedly supported For non-codebook based UL transmission, the following limitations exist.

Ambiguity on a method of mapping each SRS resource to each panel

For PUSCH transmission, multiple panels cannot be used simultaneously or are limitedly supported.

Another important point for multi-panel UEs is a distance between panels.

For handheld devices, a distance between the panels is not long, but for large devices such as automobiles, a distance between the panels may be long.

Fora vehicle UE, a vehicle (e.g., automobile) may be a device that receives a signal for downlink (DL) and that transmits a signal for uplink (UL).

For sidelink, the vehicle may be a transmitter and/or a receiver. Most of the current vehicles have antennas that are geographically co-located (e.g., single panel), but in order to obtain a more gain from multiple antennas (e.g., beamforming, spatial diversity), and to satisfy NR requirements (some NR bands should use 4 or more Rx antennas), geographically distributed antennas (e.g., multi-panel) are being considered.

For geographically dispersed antennas at the vehicle UE side, the distance between the panels may be as large as several meters or more (e.g., one panel at a front bumper and another panel at a rear bumper).

Additionally, the orientation/boresight/direction of each panel may be different. Therefore, fading characteristics of each panel may be completely different from each other.

Further, each panel may have different hardware characteristics. For geographically distributed antennas, when the distributed antennas share a common baseband processor (modem), a distance from each panel to a baseband processor may be particularly different.

Therefore, gain imbalances for different panels may occur for both transmission and reception. Further, differences in cable length may cause different delays (i.e., timing synchronization) over different panels. Because the addition of a timing adjustment processor/circuit may increase a UE implementation cost, the timing difference over different panels may or may not be adjusted internally depending on the UE implementation.

In addition to cabling, the use of different hardware components per panel (e.g., oscillators, different RF/circuit structures, amplifiers, phase shifters, etc.) may lead to differences in channel characteristics experienced on different panels such as phase noise, frequency offset, and timing offset.

In the present disclosure, a 'panel' may mean a physical transmission/reception antenna group closely positioned in relation to hardware implementation.

A panel, an uplink synchronization unit (USU), an uplink transmission unit (UTU), and the like used in the present disclosure may be generally expressed as a transmission unit, and may be used in various expressions in a range that does not differ in meaning.

However, from a standard document point of view, a 'panel' may represent a group of antenna ports (i.e., logical antennas) having a common point in terms of effective channels due to shared hardware components (e.g., amplifiers, hardware boards, etc.) as well as geographical locations not far from each other.

More specifically, antenna ports transmitted from the same panel may be observed in the same receiver or a receiver similar in long-term channel characteristics such as average path-loss, average Doppler shift, and average delay.

For the reception point of view, for a transmitted antenna port, signals observed from different logical antennas in the same panel may be assumed to have commonality in terms of long-term channel characteristics.

In addition to the aforementioned long-term channel characteristics, a panel may share the same Tx/Rx (analog) beam or beam set, but other panels may use other (analog) beams or beam sets. That is, it is highly likely that each panel will individually control a beam due to geographical differences.

In the present disclosure, '/' may mean 'or' or 'and/or' depending on the context.

The present disclosure specifically focuses on the UL synchronization problem for multi-panel UEs among the aforementioned problems. For multi-panel UEs, the best timing advance (TA) value may vary in each panel depending on the above-mentioned UE implementation (e.g., distributed antenna in the UE). In previous systems, because it is assumed that the geographic locations of multiple antennas in the UE are sufficiently close to each other, one TA value is provided by the gNB for one component carrier (CC) of the same device.

Further, it is assumed that UL Tx timing through different transmission antennas is well-calibrated inside the UE as UE implementation.

As mentioned above, two existing assumptions (geographic location and internal calibration) may no longer be maintained for new device types (e.g., vehicle UE).

Therefore, there is a need to introduce a new signaling method that allows different TA values for different panels.

A unit that shares/non-shares a common TA value may not match hardware implementation for an actual panel. For example, when some panels are well calibrated internally and/or geographically closely, even if they are multiple panels, they may share the same TA value. As another example, each panel may generate a plurality of UL (analog) beams or be configured with a plurality of UL antenna subsets, and even if each panel belongs to the same panel according to a UE implementation method, each panel has the potential to have significantly different channel characteristics in different beams (sets) or antenna subsets.

For example, when different beams are generated using different antenna sets within a panel, and when hardware characteristics of each antenna set are significantly different from each other, the assumption (i.e., one TA value per panel per CC) may be incorrect. Therefore, it is proposed to define a general term (i.e., UL synchronization unit: USU) representing a group of UL antenna ports and/or a group of synchronized physical UL channels (with respect to UL timing).

The USU may correspond to one or more UL panels, one or more UL beams, or a group of UL antennas in UL panels according to different UE implementation.

Hereinafter, a method of configuring a plurality of TA values (or TA offset values) upon uplink transmission based on a plurality of USUs (per CC or per BWP) proposed in the present disclosure will be described in detail through related drawings and proposals.

First, a definition of USU and related contents will be described through Proposal 1.

(Proposal 1)

Proposal 1 defines a general term UL Synchronization Unit (USU) associating/grouping UL antenna ports (APs) and/or physical UL channels to which a common TA value is applied within a CC (or within a BWP).

The USU may include UL antenna ports (APs) having the same RS/channel type as well as different RS/channel types.

For example, the USU may include a set of SRS APs (or SRS resources), a set of PUCCH DMRS APs (or PUCCH resources), a set of PUSCH DMRS APs (or PUSCH resources), and/or a set of PRACH preambles/resources.

Grouped APs/channels may share a common TA value per CC/BWP, and ungrouped APs/channels may have different TA values per CC/BWP. That is, the USU may be a unit for APs/channels that share a common TA value.

The USU may mean one or more UL panels, one or more UL beams, or a UL antenna group in the UL panel.

Most of information on the above described USU may be provided by RRC signaling so that it does not change frequently.

However, certain types of APs/channels associated with the USU may need to be changed more often than other methods according to panel activation/deactivation, radio channel status, and the like.

For example, the association of PUCCH/PUSCH (APs) to the USU needs to be changed more often than that of SRS/PRACH to the USU.

Therefore, lower layer signaling (e.g., MAC CE and/or DCI, etc.) than an RRC layer may be used for changing USU mapping for APs/channels more quickly and frequently.

After the UE successfully receives TA values for USUs from the gNB, in order to transmit a specific UL signal, the UE may transmit the specific UL signal by applying a TA value corresponding to the associated USU or including the corresponding UL signal.

When two SRS resources are set to the UE, an SRI #0 may be set to a USU #0 and an SRI #1 may be set to a USU #1. The UE may transmit an SRS resource #0 having TA #0 on a specific panel indicating a panel #0, and transmit an SRS resource #1 having TA #1 on another panel indicating a panel #1. Here, the USU may correspond to each panel.

When a specific PUCCH resource is set on the USU #0, the UE uses a panel #0 for transmission of the corresponding PUCCH resource (by applying a corresponding TA value, e.g., TA #0). Actual mapping between the USU and the panel (or beam) may depend on the UE, but the UE should use the same physical resource (e.g., panel) for transmission of an UL signal included in the same USU. That is, the panel index is a logical panel index, and a method of mapping an actual physical panel/physical antenna/beam to the logical panel index may vary depending on implementation of the UE.

For transmission of PUSCH (or multi-layer PUCCH), one PUSCH may be associated with a plurality of USUs. For example, for a plurality of USUs associated/used in one PUSCH transmission, each USU may include only part of a PUSCH layer (e.g., some of PUSCH DMRS ports for USU #0 and other PUSCH DMRS ports for USU #1). In other words, USUs may be mapped in units of a layer group. For PUSCH transmission, associated USU information may be dynamically indicated through DCI instead of being configured through higher layer signaling.

The associated USU information may be transmitted through a dedicated DCI field or using dedicated RNTI per USU.

When a plurality of USUs are indicated for PUSCH transmission, the association between a PUSCH layer and a USU ID may be dynamically indicated through DCI instead of being pre-configured through higher layer signaling. In this case, higher layer signaling (e.g., RRC and/or MAC-CE) may provide information on which candidates of the USU set that can be used for PUSCH transmission are. Thereafter, lower layer signaling (e.g., DCI) may indicate USU set information to be actually applied and/or which layer(s) each USU included in the corresponding USU set should be associated with.

Instead of signaling the association between PUSCH layers and USUs, it is also possible to define a rule for the association in advance (e.g., for rank 3 transmission, when two USUs are associated, there is defined a rule that first two layers are mapped to a first USU and that a last layer is mapped to a second USU).

A signal or physical uplink channel (e.g., PUSCH or PUCCH) that is not associated with any USUs or associated with a plurality of USUs for the same layer(s) may be allowed.

In this case, the same UL signal may be (duplicately) transmitted on a plurality of physical resources (e.g., panels) with different TA values applied to each physical resource according to a TA command for each USU. For example, the same UL channel/signal/layer may be repeatedly/redundantly transmitted (by applying a TA value corresponding to each USU) in USU #0 and USU #1.

From the gNB/network point of view, the gNB/network needs to know the number of TA values that need to be separately controlled for the same CC/BWP.

When the network knows the number of TA values, the network may set PRACH resources to the UE according to the number of TA values. Further, when a UE is capable of simultaneous transmission for a plurality of USUs/panels, this may correspond to important information on whether different TA values may be simultaneously applied in the UE. That is, information on the number of TA values may correspond to whether different AP/channel resources/beams corresponding to different USUs may be multiplexed in frequency (FDM: frequency domain multiplexing).

When the USU corresponds to the panel, any UE may transmit only one UL signal on one panel. That is, multi-panels may be implemented into panel level switches.

For this type of UEs, a plurality of TA values need to be managed, but only one TA value may be applied at a time.

For different types of UEs, by applying different TA values for each panel, UL signals may be simultaneously transmitted on different panels. From the gNB/network point of view, the information is required to configure/trigger different UL signals/channels.

FIG. 21 is a diagram illustrating the concept of a USU proposed in the present disclosure.

The USU may be interpreted in the same sense as a panel, but more accurately, it is a concept corresponding to one or more panels. In this case, as illustrated in FIG. 21, the USU may mean an antenna (port) group at a specific location.

Ina vehicle (vehicle UE) of FIG. 21, four USUs 2101, 2102, 2103, and 2104 are illustrated, and each USU may correspond to an antenna group including two antennas (or antenna ports).

Hereinafter, a USU-based uplink transmission method will be described based on the above-described proposal 1.

The following embodiments and proposals may be largely classified according to whether the gNB knows an USU configuration of the UE and provides the USU configuration to the UE for USU-based uplink transmission.

First Embodiment

The first embodiment relates to a USU-based uplink transmission method when a USU configuration is transmitted to a UE and all information associated with the USU is included in the USU configuration.

FIG. 22 is a flowchart illustrating an example of a USU-based uplink transmission method proposed in the present disclosure.

Here, uplink transmission may mean transmission of a PRACH, SRS, PUCCH, PUSCH, and the like.

First, the UE transmits information on the total number of USUs required (or supported or configured) (per CC or per BWP) and/or information on the maximum number of USUs that can be simultaneously transmitted to the gNB (S2210). The information may be transmitted through capability information.

Additionally, the UE may transmit time (symbol(s), slot(s)) information required for USU switching to the gNB.

The UE receives USU configuration information for USU-based uplink transmission from the gNB (S2220).

The USU configuration information may include an USU ID, a PRACH preamble/resource associated with a USU, a timing advance (TA) associated with the USU, a DL RS associated with the USU, an SRS resource associated with a USU, a PUCCH resource associated with a USU, a PUSCH associated with a USU, a TPC command associated with a USU, and the like. Information included in the USU configuration information may be transmitted through the same message or different messages.

The USU configuration information may be included in RRC signaling and be expressed as a USU Configuration Information Element (IE).

Here, it may be desirable to set the USU ID for PUCCH/periodic SRS, etc. to RRC signaling.

The UE performs uplink transmission through a plurality of USUs based on the USU configuration information (S2230).

Here, the gNB may instruct the UE to activate/deactivate a specific USU through MAC CE and/or DCI, or may instruct information on a specific USU used for uplink transmission to the UE.

For example, when the gNB triggers an aperiodic SRS/PUSCH or the like to the UE, the gNB may transmit DCI including a USU ID to the UE.

A method for configuring/indicating a plurality of TA values corresponding to a plurality of USUs in order to perform uplink transmission through a plurality of USUs will be described in more detail.

The first embodiment is a case where the gNB knows a USU configuration of the UE, and will be described with reference to a contention-free RACH procedure (CFRA) related thereto. A basic procedure of CFRA refers to the previous description.

That is, the S2230 procedure of FIG. 22 will be described in detailed as follows.

The UE receives a DCI (PDCCH order) including a USU ID (e.g., USU ID=X) from the gNB.

The UE transmits a PRACH preamble (MSG1) associated with the USU ID to the gNB.

The UE receives a random access response (RAR) including a TA value associated with the USU ID from the gNB.

Here, the UE may receive a plurality of TA values (or default (or reference or reference) TA values/TA offset values) corresponding to a plurality of USU IDs per CC (or per BWP).

In this case, each USU ID may correspond to each TA value (or each TA offset value), but according to a gNB configuration or report information of the UE, a plurality of TA values may correspond to one USU ID or one TA value may correspond to a plurality of USU IDs.

The UE performs uplink transmission on the at least one USU based on the TA value.

Previously, with respect to the method for the UE to receive a plurality of TA values corresponding to a plurality of USUs, the gNB may check the USU associated with the PRACH preamble, map the corresponding TA, and then transmit a plurality of TA values to the UE at one time or respectively through MSG 2, MSG 4, and an additional message.

Here, with respect to a method of transmitting each of the plurality of TA values, the gNB may transmit a specific TA value to the UE and then transmit differential TA values for the specific TA value. More detailed information related to this refers to Proposals 5 and 6 to be described later.

Further, a TA adjustment command indicating an increase or decrease in the TA value may be performed by applying a method of transmitting a plurality of TA values corresponding to a plurality of USUs previously described. More detailed information related to this refers to Proposal 8 to be described later.

Further, when uplink transmission is performed through a plurality of USUs, a transmit power control (TPC) associated with a plurality of USUs may also be applied as described above. More detailed information related to this refers to Proposal 8 to be described later.

When the contents described in the first embodiment are not against/contradicted with the contents to be described in the embodiments to be described later, the contents may be equally applied in the embodiments to be described later to be implemented to perform uplink transmission of the UE.

Second Embodiment

The second embodiment relates to a USU-based uplink transmission method when a USU configuration is transmitted to a UE and only some information related to the USU is included in the USU configuration.

More specifically, the second embodiment relates to a USU-based uplink transmission method after RRC connection of a UE.

In particular, a case where the USU configuration information does not include a PRACH preamble/resource associated with the USU, a TA value associated with the USU, etc. will be described.

FIG. 23 is a flowchart illustrating another example of a USU-based uplink transmission method proposed in the present disclosure.

Here, uplink transmission may mean transmission of a PRACH, SRS, PUCCH, PUSCH, and the like.

The second embodiment is a case where the gNB does not know a PRACH preamble/resource associated with a USU, a TA value associated with a USU, etc. and will be described with reference to a contention-based RACH procedure (CBRA). A basic procedure of CBRA refers to the previous description.

First, the UE transmits information on the total number of USUs required (or supported or configured) (per CC or per BWP) and/or information on the maximum number of USUs that can be simultaneously transmitted to the gNB (S2310). The information may be transmitted through capability information.

Additionally, the UE may transmit time (symbol(s), slot(s)) information required for USU switching to the gNB.

The USU configuration information may include a USU ID, a DL RS associated with the USU, an SRS resource associated with the USU, a PUCCH associated with the USU, a PUSCH associated with the USU, and the like. That is, it is assumed that the USU configuration information does not include information on the USU associated with the RACH procedure. Information included in the USU configuration information may be transmitted through the same message or different messages.

The USU configuration information may be included in RRC signaling and be expressed as a USU Configuration Information Element (IE).

Here, it may be desirable to set a USU ID for a PUCCH/periodic SRS, etc. to RRC signaling.

The UE transmits a PRACH preamble (MSG1) to the gNB based on a specific USU (S2320). In this case, because the gNB does not know the USU configuration such as the USU ID, the gNB cannot know through which USU the PRACH preamble is transmitted.

The UE receives a random access response (MSG2) including a TA value and resource allocation information for uplink transmission from the gNB (S2330).

The UE transmits an uplink signal corresponding to MSG3 (or scheduled transmission) to the gNB (S2340).

Here, the UE may transmit an USU ID used when transmitting the PRACH preamble or when transmitting MSG 3 and/or USU configuration information of the UE.

When the USU ID is received through MSG3, the gNB may know which USU ID corresponds to the TA value included in the RAR.

When information on the USU ID is transmitted together when transmitting the PRACH preamble, the uplink signal may include only USU configuration information of the UE.

When a plurality of USUs are associated with the PRACH preamble, information on the USU such as a USU ID corresponding to the TA, may be transmitted through options 1 to 5 to be described later, or may be determined according to a predetermined rule.

In the following UE procedures, because the gNB knows the USU configuration information of the UE, the steps mentioned in the first embodiment may be applied.

Third Embodiment

The third embodiment relates to a method of transmitting a USU-based uplink signal by transmitting a USU configuration to a UE in an initial access procedure.

FIG. 24 is a flowchart illustrating another example of a USU-based uplink transmission method proposed in the present disclosure.

The third embodiment is a case in which the gNB does not know a PRACH preamble/resource associated with the USU, a TA value associated with the USU, etc., and will be described with reference to a contention-based RACH procedure (CBRA). A basic procedure of CBRA refers to the previous description.

First, the UE transmits a PRACH preamble (MSG1) to the gNB based on a specific USU (S2410). In this case, because the gNB does not know a USU configuration such as the USU ID, the gNB cannot know through which USU the PRACH preamble is transmitted.

The UE receives a random access response (RAR, MSG2) including a TA value and resource allocation information for uplink transmission from the gNB (S2420).

The UE transmits an uplink signal corresponding to MSG3 (or scheduled transmission) to the gNB (S2430).

Here, the UE may transmit the USU ID used when transmitting the PRACH preamble or when transmitting MSG 3 and/or USU configuration information of the UE. When the USU ID is received through MSG3, the gNB may know which USU ID corresponds to the TA value included in the RAR.

When information on the USU ID is transmitted together when transmitting the PRACH preamble, the uplink signal may include only USU configuration information of the UE.

When a plurality of USUs are associated with the PRACH preamble, information on the USU such as a USU ID corresponding to the TA, may be transmitted through options 1 to 5 to be described later, or may be determined according to a predetermined rule.

The UE transmits information on the total number of USUs required (or supported or configured) (per CC or per BWP) and/or information on the maximum number of USUs that can be simultaneously transmitted to the gNB (S2440). The information may be transmitted through capability information.

Additionally, the UE may transmit time (symbol(s), slot(s)) information required for USU switching to the gNB.

Fourth Embodiment

The fourth embodiment relates to a method for solving a problem that may occur when performing uplink transmission based on a plurality of USUs without notifying a gNB of a USU configuration of a UE.

In this regard, a solution method when the UE receives a plurality of RNTIs (TC-RNTIs or C-RNTIs) in the RACH procedure will be described as an example.

First, the UE transmits a plurality of PRACH preambles associated with a plurality of USUs to the gNB.

The UE receives assignment of a plurality of TC-RNTIs or a plurality of C-RNTIs for a plurality of PRACH preambles from the gNB.

When the UE receives assignment of a plurality of TC-RNTIs or a plurality of C-RNTIs, the UE notifies (or reports) this (that the UE receives assignment of a plurality of RNTIs) to the gNB.

In this case, the UE may request to merge the plurality of RNTIs or may request to discard some of the plurality of RNTIs to the gNB.

A more specific method will be described with reference to FIG. 25.

FIG. 25 is a flowchart illustrating another example of a USU-based uplink transmission method proposed in the present disclosure.

Here, uplink transmission may mean transmission of a PRACH, SRS, PUCCH, PUSCH, and the like.

First, the UE transmits information on the total number of USUs required (or supported or configured) (per CC or per BWP) and/or information on the maximum number of USUs that can be simultaneously transmitted to the gNB (S2510). The information may be transmitted through capability information.

The UE transmits a plurality of PRACH preambles associated with a plurality of USUs to the gNB through the plurality of USUs (S2520).

Thereafter, the gNB transmits each of a plurality of MSG2s (RARs) to the UE using different RA-RNTIs for each of the plurality of PRACH preambles (S2530). That is, the UE receives each of a plurality of RARs from the gNB.

Here, each MSG2 includes a TA value, PUSCH resource allocation (for MSG3), and TC-RNTI.

Thereafter, the UE transmits a plurality of scheduled transmissions, that is, a plurality of MSG3s to the gNB (S2540). Here, each MSG3 is scheduled by each MSG2.

The UE transmits information on overlapped TC-RNTIs to the gNB through MSG3.

Thereafter, the gNB transmits only one C-RNTI through one MSG4 or the same C-RNTI through a plurality of MSG4s to the UE (S2550). A more detailed description related to this refers to Proposal 8 to be described later.

FIG. 26 is a flowchart illustrating another example of a USU-based uplink transmission method proposed in the present disclosure.

More specifically, FIG. 26 illustrates a method of performing uplink transmission based on a plurality of USUs in an initial access procedure.

Here, uplink transmission may mean transmission of a PRACH, SRS, PUCCH, PUSCH, and the like.

The UE transmits a plurality of PRACH preambles associated with a plurality of USUs to the gNB through the plurality of USUs (S2610).

Thereafter, the gNB transmits each of a plurality of MSG2s (RARs) to the UE using different RA-RNTIs for each of the plurality of PRACH preambles (S2620).

Here, each MSG2 includes a TA value, PUSCH resource allocation (for MSG3), and TC-RNTI.

Thereafter, the UE transmits a plurality of scheduled transmissions, that is, a plurality of MSG3s to the gNB (S2630). Here, each MSG3 is scheduled by each MSG2.

The UE transmits information on overlapped TC-RNTIs to the gNB through MSG3.

Thereafter, the gNB transmits only one C-RNTI through one MSG4 or the same C-RNTI through a plurality of MSG4s to the UE (S2640). A more detailed description related to this refers to Proposal 8 to be described later.

The UE transmits information on the total number of USUs required (or supported or configured) (per CC or per BWP) and/or information on the maximum number of USUs that can be simultaneously transmitted to the gNB (S2650). The information may be transmitted through capability information.

Fifth Embodiment

The fifth embodiment relates to a method of controlling uplink transmit power for each USU ID.

First, before describing in detail the fifth embodiment, a brief description of power control and transmit power control procedures will be described.

Power Control

In a wireless communication system, it may be necessary to increase or decrease transmit power of a UE (e.g., user equipment) and/or a mobile device according to a situation. Controlling transmit power of the UE and/or the mobile device in this way may be referred to as uplink power control. For example, the transmit power control method may be applied to satisfy a requirement (e.g., Signal-to-Noise Ratio (SNR), Bit Error Ratio (BER)), Block Error Ratio (BLER)) from the gNB (e.g., gNB, eNB, etc.)

Power control as described above may be performed by an open-loop power control method and a closed-loop power control method.

Specifically, the open-loop power control method means a method of controlling transmit power without feedback from a transmitting device (e.g., gNB) to a receiving device (e.g., UE) and/or feedback from the receiving device to the transmitting device. For example, the UE may receive a pilot channel/signal from the gNB and estimate the strength of received power by using the pilot channel/signal. Thereafter, the UE may control transmit power by using the estimated strength of received power.

However, the closed-loop power control method means a method of controlling transmit power based on feedback from a transmitting device to a receiving device and/or feedback from a receiving device to a transmitting device. As an example, the gNB receives a pilot channel/signal from the UE, and determines an optimal power level of the UE based on a power level, SNR, BER, BLER, etc. measured by the received pilot channel/signal. The gNB transmits information (i.e., feedback) on the determined optimal power level to the UE through a control channel or the like, and the UE may control transmit power using the feedback provided by the gNB.

Hereinafter, a power control scheme for cases in which a UE and/or a mobile device performs uplink transmission to a gNB in a wireless communication system will be described in detail.

Specifically, hereinafter, power control schemes for transmission to 1) an uplink data channel (e.g., Physical Uplink Shared Channel (PUSCH), 2) an uplink control channel (e.g., Physical Uplink Control Channel (PUCCH), 3) a sounding reference signal (SRS), 4) a random access channel (e.g., Physical Random Access Channel (PRACH)) are described. In this case, transmission occasions for the PUSCH, PUCCH, SRS, and/or PRACH (i.e., transmission time unit) may be defined by (i) a slot index (n_s) in a frame of a system frame number (SFN), a first symbol in a slot (S), and the number of consecutive symbols (L)

Power Control Procedure

FIG. 27 is a flowchart illustrating an example of a power control procedure.

First, a UE may receive a parameter and/or information related to transmit power (Tx power) from the base station (gNB) (S2710).

In this case, the UE may receive the corresponding parameter and/or information through higher layer signaling (e.g., RRC signaling, MAC-CE, etc.). For example, in relation to PUSCH transmission, PUCCH transmission, SRS transmission, and/or PRACH transmission, the UE may receive parameters and/or information related to transmit power control defined in TS 38.331.

Thereafter, the UE may receive a TPC command related to transmit power from the gNB (S2720). In this case, the UE may receive the corresponding TPC command through lower layer signaling (e.g., DCI). For example, in relation to PUSCH transmission, PUCCH transmission, and/or SRS transmission, the UE may receive information on a TPC command to be used for determining a power control adjustment state, etc. through a TPC command field of a predefined DCI format. However, in the case of PRACH transmission, the corresponding step may be omitted.

Thereafter, the UE may determine (or calculate) transmit power for uplink transmission based on parameters, information, and/or TPC commands received from the gNB (S2730).

Thereafter, the UE may transmit one or more uplink channels and/or signals (e.g., PUSCH, PUCCH, SRS, PRACH, etc.) to the gNB based on the determined (or calculated) transmit power (S2740).

FIG. 28 is a flowchart illustrating an example of a USU-based uplink transmission method through a power control procedure for each USU ID proposed in the present disclosure.

First, the UE receives a parameter and/or information related to transmit power from the gNB (S2810).

In this case, the UE may receive the corresponding parameter and/or information through higher layer signaling (e.g., RRC signaling, MAC-CE, etc.).

Thereafter, the UE receives a TPC command including USU information from the gNB (S2820). In this case, the UE may receive the corresponding TPC command through lower layer signaling (e.g., DCI).

The USU information may be, for example, a USU ID, and there may be a mapping relationship between the TPC and the USU ID.

Here, the UE may receive a plurality of TPC commands for multiple USU-based uplink transmission, and one TPC command may correspond to one USU ID or a plurality of USU IDs.

Thereafter, the UE determines (or calculates) transmit power for uplink transmission for each USU ID based on parameters, information, and/or TPC commands received from the gNB (S2830).

Thereafter, the UE transmits a plurality of USU-based uplink channels and/or signals (e.g., PUSCH, PUCCH, SRS, PRACH, etc.) to the gNB based on transmit power determined (or calculated) for each USU ID (S2840).

A more detailed description related to this refers to a description of Proposal 8 to be described later.

(Proposal 2)

The UE reports information on the required total (additional) number (N) of USU (or TA value) (per CC) to the gNB/network.

Further, the UE reports information on the maximum number (M) of USUs (or TA values) (per CC) that can be simultaneously applied (or transmitted) to the gNB/network.

Here, 'simultaneous transmission' may represent transmission on the same symbol (set) or the same slot.

When information on M is reported, the UE does not expect to be configured/indicated to transmit UL signals/channels belonging to the M number or more USUs in a given time unit (e.g., symbol, symbol set, slot).

The 'UL signal/channel' may include symbols other than symbols for the actually indicated UL signal/channel (e.g., one additional symbol transmitted before/after the indicated UL signal/channel). For example, when one symbol is added before and after and a rule is applied, it means that a gap of one symbol is required when the USU is changed in order to sequentially transmit a signal using a different USU for a UE with M=1.

Even if symbol indices set as one of reasons for considering additional (gap) symbol(s) do not overlap, this is because that applying different TA values to different UL signals may cause a symbol boundary to be misaligned and thus different UL signals may collide on a symbol positioned at a front surface or a rear surface.

Another reason for the need for a (gap) symbol is that a time may be required for panel/beam/antenna switching, and the time required in this case may affect the number of additionally added symbols (or slots). In particular, for panel switching, it may take a relatively long time until hardware of the panel is sufficiently stable after panel activation, and the required time may vary depending on the UE implementation.

Therefore, a time (or symbol or slot) required to switch the USU may be reported by the UE. Additionally, the number of symbols to be added may be set by the gNB/network. Different numbers may be applied depending on whether the beam is switched within the panel and whether the panel is switched.

Further, the information (M) may be generalized (or replaced) as to which of the N USUs can or cannot be transmitted simultaneously, such as USU grouping information.

For example, three USUs may be required, two of the three may be allocated to two different beam or antenna groups, respectively, belonging to one panel and the other one may be allocated to another panel. That is, two USUs may be included in one panel, and one USU may be included in the other one.

It is assumed that only one USU may be applied at one moment among two USUs belonging to one panel due to switching-based implementation within the panel, and it is assumed that both panels may be transmitted simultaneously. In this case, the maximum number M may not be sufficient information.

Rather, in this case, an accurate combination of USUs that can be applied/transmitted simultaneously may be more useful.

In the above example, USUs that cannot be transmitted simultaneously (i.e., USUs in a panel) may be grouped together. It may be assumed that different USU groups may be simultaneously transmitted.

Alternatively, an opposite method of grouping, that is, a method of including USUs that can be transmitted simultaneously within a USU group, and USUs that cannot be transmitted simultaneously between different USU groups, is also possible. That is, a USU configuration from the viewpoint of enabling/disabling simultaneous transmission and a USU configuration from the viewpoint of applying the same/different TA within the same CC/BWP may be made separately.

When the proposed information N is reported by the UE, the network may set (or expect to set) the N number of USUs to the UE. Each USU may be associated with one or more PRACH preamble/resources, SRS resources/APs, PUCCH resources, and/or PUSCH. That is, when the PRACH preamble/resource is configured (UE-specifically), each PRACH preamble/resource may be associated with a specific USU (ID).

Based on the association, when the UE receives a TA command in response to a specific PRACH preamble/resource, the UE may assume that the corresponding TA value corresponds to/applies to all other UL signals/channels (e.g., SRS, PUCCH, PUSCH) having the same USU as that of the PRACH preamble/resource.

However, it is also possible to obtain a TA value for each USU by alternately transmitting the same PRACH preamble/resource to different USUs (e.g., transmitting at different PRACH occasions). In this case, a plurality of USUs may share the same PRACH preamble/resource.

More specifically, a specific PRACH may be configured/defined so that there is no configuration associated with any USU or to be shared for a plurality of USUs. In this case, there may be ambiguity about the USU to be applied when the UE receives the TA command. To solve this problem, accurate USU information (e.g., USU ID) needs to be signaled to the UE.

The following detailed signaling options for USU information may be considered.

(Option 1): Associated USU information is provided together with the PRACH transmission command.

(Option 2): Associated USU information is provided through MSG2.

(Option 3): Associated USU information is provided through MSG4.

(Option 4): Associated USU information is provided after an RACH procedure.

(Option 5): A TA value per USU may be updated/set using a signal (procedure) that is separate/independent from a general RACH procedure.

For the above options, one method of notifying USU information as physical layer information is to define a DCI field indicating an USD ID. Another method is to use different RNTIs per USU. Here, this mapping information (RNTI per USU) may be configured by higher layer signaling or may be predefined. Another method for signaling associated USU information is to use a higher layer message (e.g., MAC-CE or RRC).

For option 5, it may be advantageous to use higher layer signaling (e.g., MAC-CE or RRC) in consideration of a size of information. In this case, signaling (procedure) for updating part of the information (e.g., a TA value for a specific USU) may be required, and this signaling for the update may use lower layer signaling rather than signaling for configuring entire information in order to reduce the delay.

In the above, two different approach methods were proposed in terms of PRACH configuration and use for a plurality of USUs. Comparing the two approach methods, a method of using a plurality of PRACH preambles/resources (e.g., one PRACH per USU) in order to support a plurality of USUs may require more signaling overhead, but the method may reduce the delay for obtaining a plurality of TA values for a plurality of USUs.

When the PRACH resource is shared for all USUs, the PRACH resource may be saved, but because each USU should be transmitted at different occasion/timing, the delay may increase.

A hybrid approach method may also be considered. That is, the PRACH resource is shared for a subset of USUs, that is, some USUs. Because there are advantages/disadvantages of resource overhead versus delay, the number of PRACH resources to be set for a UE for a specific use/type of PRACH depends on the selection of the gNB/network, but the possible maximum number may be limited to N (per CC/BWP).

In the above proposals, the aforementioned PRACH resource associated with USUs may represent one or both of a contention-free PRACH resource and a contention-based PRACH resource.

(Proposal 3)

The PRACH preamble/resource may be associated with one or more USUs.

A TA value provided by the gNB in response to the PRACH preamble/resource corresponds to (a specific one of) USUs associated with the PRACH preamble/resource.

(When multiple or all USUs are associated with the PRACH) USU information may be additionally indicated to the UE using the proposed one or more signaling schemes (Options 1 to 5).

(When multiple or all USUs are associated with the PRACH) The USU corresponding to the indicated TA value may be implicitly determined by a rule (e.g., the n-th indicated TA value corresponds to the n-th USU among associated USUs).

The proposed methods may not be applied in some cases, particularly when determining whether to transmit the PRACH by the UE other than the gNB (e.g., initial RACH, contention-based PRACH, PRACH transmission for beam failure recovery).

In these cases, the UE may be ambiguous about which USU/PRACH/panel/beam to use. For these cases, there is proposed a method for the network/gNB to provide association information between each USU (or TA value) and DL RSs (e.g., CSI-RS resource, SSB) to the UE.

Using this information, the UE may know which USU/panel/beam/antenna/TA to use when a quality of which DL RS is good (or a threshold or more).

Based on the information, the network may indicate a related DL RS instead of the USU ID in order to represent which panel/beam to use and/or to represent which TA value to apply. For example, the proposed option 1 may be extended to indicate an associated DL RS instead of USU information. It is obvious that the proposed scheme may be applied/used not only when transmitting a contention-based PRACH or a PRACH for beam failure recovery, but also when transmitting other uplinks.

(Proposal 4)

The gNB/network provides association information between the USU (or TA value) and the DL RS (e.g., CSI-RS resources, SSBs) to the UE.

(In a beam management process, etc.) The UE may select a specific DL RS based on a reception quality thereof, and search for the USU (panel/beam/antenna and/or TA value) associated with the DL RS selected using association information between the DL RS and the USU to enable to apply the corresponding USU to specific UL transmission (initiated by the UE).

In the above approach method, one USU may be associated with multiple DL RSs, and one DL RS may be associated with a plurality of USUs. In the latter case, when the associated DL RS is selected, the UE may use a plurality of panels/beams/antennas (USUs) for transmission of APs/channels.

In order to further enhance reliability in a DL RS-based USU selection scheme, it is also possible for the UE to select two or more DL RSs.

In addition to the above approach, it may also be possible to use all USUs (panel/beam) (that can simultaneously transmit) (in the case of UL transmission initiated by the UE) in order to sacrifice UE power but to enhance coverage and reliability. It is also possible to together support the above several methods (a method based on selection of USUs, a method of transmitting using all USUs) with a complementary method. In this case, the network/gNB may set which scheme to use for specific UL transmission.

When the UE may simultaneously transmit a plurality of USUs, the UE may (simultaneously) transmit a plurality of PRACH preambles/resources, and each PRACH is transmitted in a different set of panel/beam/antennas. In this case, the UE needs to receive a plurality of TA values, by one for each USU, as a response to the PRACHs. Efficient signaling methods are proposed in this case as follows.

(Proposal 5)

After (simultaneous) transmission of a plurality of PRACH preambles/resources in the UE, (Method 1): The gNB simultaneously provides a plurality of TA values through MSG2 or MSG4.

In this case, mapping between each TA value and each PRACH (or USU(s)) may be explicitly or implicitly transmitted.

As an example of implicit signaling, indicated TA values are TA #1, TA #2, . . . , TA #K.

Thereafter, TA #k corresponds to a PRACH preamble/resource ID configured/indicated for the k-th USU or the k-th transmitted/configured/indicated (among PRACH preambles/resources configured for the corresponding use/type) (k=1, . . . , K).

(Method 2): The gNB first provides one TA value through MSG2, and then provides another TA value(s) through MSG4 or another message transmitted after MSG4.

The TA value provided by MSG2 represents one or more of the following.

TA value that needs to be applied for transmission of MSG3

TA value corresponding to a specific USU

In this case, (ID) information for the specific USU may be additionally indicated by the gNB or may be determined by a specific rule (e.g., USU ID corresponding to the lowest USU ID and the lowest PRACH preamble/resource ID).

For USU information signaling, a DCI field-based and/or RNTI-based method proposed in options 1 to 5 may be applied.

Reference value for signaling subsequent TA information

To reduce overhead, a TA value(s) transmitted in MSG4/other messages may represent a differential value(s) for the TA value signaled in MSG2.

One initial/default/reference USU among a plurality of USUs may be defined or may be assumed. The initial/default/reference USU may refer to a USU selected to use for (initial or earlier) PRACH transmission by the UE and/or corresponding to initially (or first or previously) obtained TA value and/or used for communication with the gNB so far.

The UE may use one initial/default/reference USU (e.g., panel) until the network indicates or allows to use a plurality of USUs or switch to another USU(s).

In this sense, the N value of proposal 2 may represent the number of additional USUs other than the initial/reference/default USU.

For example, when the UE has two panels (i.e., two USUs), the UE may initially (arbitrarily) select and use one panel (e.g., for contention-based PRACH transmission and subsequent UL transmission), and apply the TA value transmitted by the gNB responding to the UE as the TA value for the selected panel (as a default TA value for the default USU).

Thereafter, the UE may notify the gNB (by request of the gNB or autonomously by the UE) that there are one or more USUs in which different TA values need to be applied. In this example, N=1. Using the modified definition of N, the following exemplary procedure will be described.

Step 1) The UE autonomously selects a USU (e.g., panel) for transmission of MSG1 (e.g., contention-based PRACH) and transmits the MSG1, Step 2) A TA value is provided by MSG2. The TA value in this case corresponds to a default TA value for the USU selected for MSG1 transmission.

Step 3) The UE notifies the existence of a value of N or an additional USU through MSG3.

Step 4) The gNB triggers (sequentially or simultaneously) transmission of N (contention-free) PRACH(s) through MSG4 or another message.

Step 5) The UE transmits the N number of PRACH(s), receives a response thereto from the gNB, and receives TA value(s) for USU(s) other than the USU used for MSG1 transmission.

In this case, the contention-based PRACH may be transmitted in a default USU, and the contention-free PRACH may be allocated to/used for other USUs. For enhanced signaling efficiency, a TA value for a USU other than the default/reference USU may be notified to the UE as a differential value of the default/reference TA value for the default/reference USU. This is because the TA value is generally determined by a distance between the UE and the gNB, and (especially when signals transmitted from each panel are received by the same gNB/TRP), the difference in TA value caused by positions of different panels of the UE, the difference in transmission timing, or the difference in direction may be smaller than the difference in TA value determined by the distance between the UE and the gNB.

The (initial) reference TA value may be transmitted to the UE in response to the contention-based PRACH, and the differential TA value may be transmitted to the UE in response to the contention-free based PRACH.

The difference in TA values between different USUs may be mainly due to a relative distance (e.g., cabling delay) of the panel rather than an absolute position of the panel. In this case, a differential TA value, which may be referred to as delta TA, may need to be changed less frequently than an actual TA value that may be changed relatively quickly according to a moving speed of the UE.

Therefore, for enhanced signaling efficiency in TA indication, higher layer messages (e.g., MAC-CE, RRC) may be more advantageous than signaling of delta-TA compared with signaling of default/reference TA.

(Proposal 6)

After obtaining a TA value for (initial/default/basic) communication with the gNB, the UE may request/report information on the existence of additional USU(s) and/or the number of (additional) USUs to the gNB.

In response to the request/report, the gNB may trigger (immediately) PRACH(s) for additional USU(s).

The report/request information may be replaced with 'request/report for need of additional UL synchronization (process and/or required TA value(s) (or process(s))'.

The additional TA value may be known as a differential value for the initially (previous) obtained TA value (i.e., delta-TA).

The delta-TA value(s) may be signaled through a higher layer message.

UL signals transmitted from each UE panel may be targeted to the same transmission and reception point (TRP) as well as different TRPs.

For a case in which a plurality of USUs target a common TRP (or a TRP beam or a TRP panel), different TA values per USU may be for synchronous UL reception of a target TRP. Therefore, when it is possible to define a TA adjustment command (i.e., increase or decrease of a previous TA) commonly applied to a plurality of TA values to be applied to a plurality of USUs, it may be more efficient.

For example, when the gNB instructs the UE to decrease the TA by J samples, even if (absolute) TA values for each USU are independently signaled, the UE decreases TA values for all (or some) USUs by J samples.

It is also possible for different USUs to be targeted to be received by different TRPs or different Rx beams/panels of the TRP.

For example, TA values are configured for synchronous reception of signals transmitted on USU #0 and USU #1 by TRP #A and synchronous reception of signals transmitted on USU #2 by TRP #B. In this case, the set of USUs sharing a TA adjustment command needs to be configured/indicated to the gNB/network, i.e., by USU #0 and USU #1, in the above example.

Further, when USU grouping information to apply together the TA adjustment command is pre-configured in the UE, the USU set/group ID may be notified together with the TA adjustment command. Alternatively, when the USU grouping information is not configured in the UE, a USU ID set to which a command is commonly applied may be notified directly to the UE (through a USU ID bitmap) together with a TA adjustment command.

(Proposal 7)

A TA adjustment command representing an increase or decrease of a TA value previously indicated by a predetermined amount from the gNB may be commonly applied to a plurality of TA values for a plurality of USUs.

Set information of USUs sharing the command may be additionally notified or indicated by the gNB.

For the (initial) RACH procedure based on contention-based PRACH, a UE having a plurality of USUs may transmit multiple PRACHs. Here, each PRACH is transmitted on a specific physical resource set (e.g., panel), and the physical resource set may be autonomously selected by the UE.

For example, the UE may transmit a PRACH #0 on a panel #0 and a PRACH #1 on a panel #1, but the network may not have information on the panel (or USU) used by the UE for transmission of each PRACH.

When the UE successfully receives only one response (i.e., MSG2) for the PRACH, the UE may use a panel corresponding to the PRACH for subsequent UL transmission.

When the UE successfully receives multiple responses, the gNB cannot distinguish whether they are multiple PRACHs transmitted by two different UEs or by the same UE and thus the UE may have two different TC-RNTIs.

After successful contention resolution based on MSG3 and MSG4, the UE may have two different C-RNTIs.

Having multiple C-RNTIs in one UE may unnecessarily increase the number of PDCCH blind detections, and unnecessarily consume RNTI resources from the gNB point of view. Therefore, it is desirable to merge a plurality of RNTIs or to discard the remaining RNTI(s) except for one RNTI.

(Proposal 8)

The UE notifies the network/gNB whether multiple temporarily cell (TC)-RNTIs or multiple C-RNTIs have been allocated and/or requests the UE to merge them to the network/gNB or to discard some of them (e.g., discard the remaining RNTIs, except for only one RNTI).

In the above, information on repeatedly allocated TC-RNTI/C-RNTIs may be included in MSG3, be a response to MSG4, and/or be transmitted through other messages.

An exemplary procedure of the above proposal 8 is given as follows:

Step 1) The UE transmits a contention-based PRACH #0 in a panel #0 and a contention-based PRACH #1 in a panel #1. In this case, the PRACH #0 and PRACH #1 may mean transmitting the same PRACH preamble/resource at different transmission timings (or occasions), or transmitting different PRACH preambles/resources at the same or different transmission timings.

Step 2) The gNB transmits two MSG2s for both the PRACH #0 and the PRACH #1, respectively, using different RA-RNTIs. Here, each MSG2 includes a TA value, PUSCH resource allocation (for MSG3), and TC-RNTI.

Step 3) The UE transmits one or two MSG3s through one or two PUSCHs. Here, each PUSCH is scheduled by each MSG2.

In MSG3, the UE notifies the gNB of occurrence of an event in which TC-RNTIs are allocated repeatedly.

For example, when two PUSCHs are used/transmitted for MSG3, at least one of two MSG3s includes information on duplicated TC-RNTIs, unnecessary TC-RNTIs to be discarded, or TC-RNTI to be used/the selected TC-RNTI (excluding TC-RNTIs to be discarded) (in addition to information to be transmitted including in the existing MSG3 such as UE-ID).

For example, when only one PUSCH is used/transmitted for MSG3, information on a PUSCH that is not used/transmitted may be included in MGS3 (other than the UE-ID, etc.).

For example, when two PUSCHs are used/transmitted for MSG3, one of the two MSG3s may include information that the MSG does not need to be responded.

Step 4) The gNB provides one C-RNTI through one MSG4 or the same C-RNTI through two MSG4s.

For the latter case, the UE may not search for MSG4, which specifies that the UE does not need to respond through MSG3 or MSG4 corresponding to a response to the MSG3 reporting that the TC-RNTI wants to be discarded.

Another example is as follows.

Steps 1) and 2) are the same as the previous procedure.

Step 3) The UE transmits two MSG3s on two PUSCHs. Here, each PUSCH is scheduled by MSG2. In the two MSG3s, typical MSG3 information (e.g., UE-ID) is included.

Step 4) The gNB provides each of two C-RNTIs through two MSG4s.

Step 5) The UE reports the occurrence of an event with multiple C-RNTIs.

Additionally, repeatedly allocated C-RNTIs, unnecessary C-RNTIs to be discarded, or selected C-RNTIs to be used may be additionally reported by the UE (e.g., in response to MSG4 or through a signaling procedure separated from the RACH (e.g., during an RRC establishment procedure), or the C-RNTI to be discarded or the C-RNTI to be used may be indicated/configured by the gNB).

For convenience of description, the case of two PRACHs/USUs/panels has been exemplified above, but it may be generalized to a case of three or more PRACHs/USUs/panels.

Because each USU will be associated with a different physical resource set (e.g., panels, beams) in the UE, it is necessary to independently control not only the TA but also uplink transmit power for each USU. For open-loop (and closed-loop) power control, as proposed in/similar to proposal 4, when DL RS information associated with each USU is configured, the corresponding DL RS may be used for path loss estimation for each USU.

For closed-loop power control, the gNB/network may instruct an increase/decrease of UL Tx power per USU. For example, it is assumed that a set of PUSCH/PUCCH DMRS layers (DMRS set #0) is associated with a USU #0 and that other PUSCH/PUCCH DMRS layers (DMRS set #1) are associated with a USU #1.

The network may wish to instruct to increase or decrease UL transmit power for a specific DMRS set (e.g., DMRS set #0). In this regard, when a TPC command is provided to the UE, USU information may be provided together. This may be provided by adding an information field (e.g., USU ID) of a DCI format for a transmit power control (TPC) command.

Another signaling option is to use different RNTIs per USU(s) for CRC scrambling of a PDCCH including a TPC command. In this case, the network needs to notify the UE of the RNTI and association information between RNTIs and USUs (by higher layer signaling) (e.g., TPC-PUCCH-RNTI0 for PUCCH resources to be transmitted/transmitted in a USU #0, TPC-PUCCH-RNTI1 for PUCCH resources to be transmitted/transmitted in a USU #1).

When a plurality of USUs share a power control process/parameter, one RNTI may be associated with a plurality of USUs.

Another method of signaling a TPC per USU(s) is to define an extended DCI format for TPC that can indicate multiple TPCs. For example, a number of TPC fields may be defined in a DCI format. Here, mapping information between each TPC and a USU(s) is explicitly indicated/configured by the gNB through another information field or a separate configuration, or each TPC is implicitly mapped to one or more USUs by a specific rule (e.g., the nth TPC is mapped to the nth USU).

Alternatively, it is also possible to jointly encode multiple TPCs into one DCI

FIELD

Based on the above proposals, it is possible to extend and apply the above-described proposals to power control per USU as well as TA per USU. That is, the USU may be redefined as a set of UL RSs/channels that share a power control process and/or a TA value.

According to the implementation, a configuration of a set of physical resources sharing power control and a configuration of a set of physical resources sharing TA may be different.

This is because the former may be more related to whether the physical resources share a power amplifier, and the latter may be more related to the difference in line delay and timing calibration_capability for physical resources (antennas, panels) from a baseband processor.

Therefore, the USU may be defined based on only one aspect. Thereafter, another information exchange procedure on which USUs have commonality/difference in different aspects may be requested to the UE and the gNB.

For example, the USU may be defined in terms of UL synchronization. In this case, the UE may notify the gNB which USUs share a process/parameter related to power control, and/or the gNB may set to the UE which USUs should share power control parameters.

In this case, for a specific TPC command, the network may indicate USU set information instead of USU information to which the TPC command is applied. Because the gNB may control more often the increase/decrease of Tx power for all panels rather than independently controlling each panel according to the overall quality of the UL signal, when there is no explicit configuration/indication related to USU information (for a specific UL signal/channel), it may be more efficient to make the indicated/calculated Pc value correspond to all USUs.

In this regard, it would be more efficient to use differential Pc values in order to reduce signaling overhead.

For example, the gNB indicates the K number of Pc parameter values. Here, a first Pc parameter value is commonly applied to all USUs, and the other (K−1) Pc parameter values correspond to (K−1) USUs (or USU sets), respectively. Here, the (K−1) Pc parameter values are differential values for the first Pc value referred to as delta-Pc values.

When the above method is applied, each of the (K−1) delta-PC values may be known as a payload size smaller than the first/reference Pc value.

It is assumed that the gNB wants to instruct the UE to increase Tx power by X dB for all panels (USUs) except for one specific panel where Tx power of a particular panel needs to be amplified by (X−1) dB.

In the proposed method, the gNB needs to indicate two Pc values. That is, Pc #0=XdB as a reference Pc and Pc #1=−1 dB as a delta-PC. Here, a second Pc may be transmitted using a smaller payload (e.g., 1 to 2 bits).

In the above example, the USU (set) ID may carry a delta-Pc value to indicate the (set) of USUs to which a TPC command is applied. Another example of using delta-Pc is that a first (or reference) Pc value corresponds to a specific USU other than all USUs. For example, an initial/default/reference USU proposed and defined in the preceding paragraph may be a specific USU.

Alternatively, a particular USU may be pre-configured by the gNB or may be predefined by a rule (e.g., a USU with the lowest ID). One specific Pc value for TPC may correspond to a specific USU (e.g., preconfigured/predefined USU), and other Pc values correspond to other USUs, respectively. Here, other Pc values may be known as differential values for a specific Pc value. The reference/first Pc value and delta-Pc value may be transmitted in the same or different messages. Here, each message may be transmitted using a signal of a different layer (e.g., on one physical layer, the other one on the MAC sub-layer) and/or the same/different signaling transport mechanisms (e.g., one is transmitted with PDCCH CRC scrambling, the other is transmitted with a DCI field).

Similar to that described in the previous paragraph with respect to delta-TA, the TPC command for the (reference/specific) USU is indicated through physical layer signaling (e.g., DCI), whereas because the (delta-)Pc values for the remaining USUs may not need to be changed frequently, they may be indicated to the UE through higher layer signaling (e.g., MAC-CE).

Throughout the present disclosure, it has been described how many TA values should be controlled per CC. In NR, a bandwidth part (BWP) is newly defined, and each BWP in a CC may have different numerology (e.g., subcarrier spacing). In the future, it may be possible to support a UE capable of simultaneously activating and managing a plurality of BWPs in the CC. Therefore, the TA value may need to be controlled for each BWP, not for CC. In this case, 'each CC' in the present disclosure may be replaced with 'per BWP' throughout the present disclosure.

Throughout the present disclosure, the defined term 'USU' has been often used based on proposal 1 for convenience of description. However, the term 'USU' may be equally applied to other proposals in which the term is not defined. Instead of defining a new term, 'USU' in the proposals may also be replaced with one or more PRACH resources/preamble/instances, SRS resource/resource set, PUCCH resources/resource sets, or PUSCH DMRS port/layer(s).

FIG. 29 is a flowchart illustrating a method of operating a terminal for performing uplink transmission proposed in the present disclosure.

First, the UE transmits a PRACH preamble to the gNB based on a transmission unit indicating a physical layer resource set (S2910).

The UE receives a random access response (RAR) including a TA value from the gNB (S2920).

The UE transmits the uplink signal based on the RAR (S2930).

Here, the UE may transmit transmission unit configuration information for a transmission unit configured in the UE to the gNB through the PRACH preamble or the uplink signal.

Additionally, the UE may transmit a first message including at least one of information on the total number of transmission units or information on the maximum number of transmission units that can be simultaneously transmitted to the gNB. The corresponding procedure may be performed after step S2930 in an initial access procedure, and be performed before step S2910 when RRC connection is established.

The transmission unit configuration information may include at least one of a transmission unit ID, a PRACH resource associated with a transmission unit, a DL RS associated with a transmission unit, an SRS resource associated with a transmission unit, a PUCCH resource associated with a transmission unit, or a PUSCH resource associated with a transmission unit.

Here, the transmission unit may be a set of an UL antenna port, an UL beam, or an UL physical channel resource related to application of a common TA value in one component carrier (CC) or one bandwidth part (BWP).

Alternatively, the transmission unit may be a set of an UL antenna port, an UL beam, or an UL physical channel resource related to application of common power control parameters in one CC or one BWP.

Alternatively, the transmission unit may be a set of an UL antenna port, an UL beam, or an UL physical channel resource related to whether simultaneous transmission is possible in one CC or one BWP and/or whether a gap symbol is applied.

The first message may further include information on a time or gap symbol required for switching between transmission units.

The information on the time or gap symbol may indicate at least one symbol or at least one slot.

General Devices to which the Present Disclosure can be Applied

FIG. 30 illustrates a wireless communication device to which methods proposed in the present disclosure can be applied according to another embodiment of the present disclosure.

Referring to FIG. 30, the wireless communication system may include a first device 3010 and a plurality of second devices 3020 located within an area of the first device 3010.

According to an embodiment, the first device 3010 may be a gNB, the second device 3020 may be a UE, and each thereof may be represented as a wireless device.

The gNB 3010 includes a processor 3011, a memory 3012, and a transceiver 3013. The processor 3011 implements the functions, processes, and/or methods proposed in FIGS. 1 to 29. Layers of a wireless interface protocol may be implemented by a processor. The memory 3012 is connected to the processor to store various pieces of information for driving the processor. The transceiver 3013 is connected to the processor to transmit and/or receive a radio signal. Specifically, the transceiver 3013 may include a transmitter that transmits a radio signal and a receiver that receives a radio signal.

The UE 3020 includes a processor 3021, a memory 3022, and a transceiver 3023.

The processor 3021 implements the functions, processes, and/or methods proposed in FIGS. 1 to 29. Layers of the wireless interface protocol may be implemented by the processor. The memory 3022 is connected to the processor to store various pieces of information for driving the processor. The transceiver 3023 is connected to the processor to transmit and/or receive a radio signal. Specifically, the transceiver 3023 may include a transmitter that transmits a radio signal and a receiver that receives a radio signal.

The memories 3012 and 3022 may exist at the inside or the outside of the processors 3011 and 3021 and may be connected to the processors 3011 and 3021, respectively, by well-known various means.

Further, the gNB 3010 and/or the UE 3020 may have a single antenna or a multiple antenna.

The first device 3010 and the second device 3020 according to another embodiment will be described.

The first device 3010 may be a gNB, a network node, a transmission UE, a reception UE, a wireless device, a wireless communication device, a vehicle, a vehicle equipped with an autonomous driving function, a connected car, a unmanned aerial vehicle (UAV), an AI module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to a 5G service, or a device related to a fourth industrial revolution field.

The second device 3020 may be a gNB, a network node, a transmission UE, a reception UE, a wireless device, a wireless communication device, a vehicle, a vehicle equipped with an autonomous driving function, a connected car, an UAV, an AI module, a robot, an AR device, a VR device, a MR device, a hologram device, a public safety device, an MTC device, an IoT device, a medical device, a FinTech device (or financial device), a security device, a climate/environment device, a device related to 5G service, or a device related to a fourth industrial revolution field.

For example, the UE may include a mobile phone, a smart phone, a laptop computer, a digital broadcasting UE, a personal digital assistant (PDA), a portable multimedia player (PMP), a navigation device, a slate PC, a tablet PC, an ultrabook, a wearable device (e.g., smartwatch, smart glass, head mounted display (HMD)), and the like. For example, the HMD may be a display device wearing on a head. For example, the HMD may be used for implementing VR, AR, or MR.

For example, the UAV may be a vehicle flying by a radio control signal without onboarding of a human. For example, the VR device may include a device that implements an object or a background of a virtual world. For example, the AR device may include a device that connects and implements an object or background of a virtual world to an object or background of the real world. For example, the MR device may include a device that combines and implements an object or background of a virtual world to an object or background of the real world. For example, the hologram device may include a device that implements a 360-degree stereoscopic image by recording and reproducing stereoscopic information by utilizing an interference phenomenon of light generated by the encounter of two laser lights called holography. For example, the public safety device may include an image relay device or an image device wearable on a user's human body. For example, the MTC device and the IoT device may be devices that do not require a human's direct intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, or preventing a disease. For example, the medical device may be a device used for the purpose of diagnosing, treating, alleviating, or correcting an injury or disorder. For example, the medical device may be a device used for the purpose of examining, replacing, or modifying a structure or function. For example, the medical device may be a device used for the purpose of controlling pregnancy. For example, the medical device may include a device for treatment, a device for surgery, a device for (extra-corporal) diagnosis, a hearing aid, or a device for a surgical procedure. For example, the security device may be a device installed to prevent a risk that may occur and to maintain safety. For example, the security device may be a camera, a CCTV, a recorder, or a black box. For example, the FinTech device may be a device capable of providing financial services such as mobile payment. For example, the FinTech device may include a payment device or a point of sales (POS). For example, the climate/environment device may include a device that monitors or predicts the climate/environment.

The first device 3010 may include at least one processor such as the processor 3011, at least one memory such as the memory 3012, and at least one transceiver such as the transceiver 3013. The processor 3011 may perform the above-described functions, procedures, and/or methods. The processor 3011 may perform one or more protocols. For example, the processor 3011 may perform one or more layers of a radio interface protocol. The memory 3012 may be connected to the processor 3011 to store various types of information and/or commands. The transceiver 3013 may be connected to the processor 3011 and be controlled to transmit and receive wireless signals.

The second device 3020 may include at least one processor such as the processor 3021, at least one memory device such as the memory 3022, and at least one transceiver such as the transceiver 3023. The processor 3021 may perform the above-described functions, procedures, and/or methods. The processor 3021 may implement one or more protocols. For example, the processor 3021 may implement one or more layers of a radio interface protocol. The memory 3022 may be connected to the processor 3021 to store various types of information and/or commands. The transceiver 3023 may be connected to the processor 3021 and be controlled to transmit and receive wireless signals.

The memory 3012 and/or the memory 3022 may be connected to the inside or the outside of the processor 3011 and/or the processor 3021, respectively and be connected to other processors through various technologies such as wired or wireless connection.

The first device 3010 and/or the second device 3020 may have one or more antennas. For example, an antenna 3014 and/or an antenna 3024 may be configured to transmit and receive wireless signals.

FIG. 31 illustrates another example of a block diagram of a wireless communication device to which methods proposed in the present disclosure can be applied.

Referring to FIG. 31, a wireless communication system includes a gNB 3110 and a plurality of UEs 3120 positioned within a gNB area. The gNB may be represented as a transmitting device, and the UE may be represented as a receiving device, and vice versa. The gNB and the UE include processors 3111 and 3121, memories 3114 and 3124, one or more Tx/Rx radio frequency modules (RF modules) 3115 and 3125, Tx processors 3112 and 3122, Rx processors 3113 and 3123, and antennas 3116 and 3126. The processor implements the previously described functions, processes, and/or methods. More specifically, in DL (communication from the gNB to the UE), higher layer packets from a core network are provided to the processor 3111. The processor implements functions of an L2 layer. In the DL, the processor provides multiplexing between logical channels and transport channels and radio resource allocation to the UE 3120, and is responsible for signaling to the UE. The transmission (TX) processor 3112 implements various signal processing functions for an L1 layer (i.e., physical layer). The signal processing function facilitates forward error correction (FEC) in the UE, and includes coding and interleaving. The coded and modulated symbols are divided into parallel streams, each stream is mapped to an OFDM subcarrier, is multiplexed with a reference signal (RS) in the time and/or frequency domain, and is combined together using inverse fast Fourier transform (IFFT) to generate a physical channel carrying time domain OFDMA symbol stream. The OFDM stream is spatially precoded to generate multiple spatial streams. Each spatial stream may be provided to a different antenna 3116 through a separate Tx/Rx module (or the transceiver 3115). Each Tx/Rx module may modulate an RF carrier with each spatial stream for transmission. In the UE, each Tx/Rx module (or the transceiver 3125) receives a signal through each antenna 3126 of each Tx/Rx module. Each Tx/Rx module restores information modulated by an RF carrier to provide the information to the reception (RX) processor 3123. The RX processor implements various signal processing functions of a layer 1. The RX processor may perform spatial processing in information in order to recover an arbitrary spatial stream directed to the UE. When multiple spatial streams are directed to the UE, they may be combined into a single OFDMA symbol stream by multiple RX processors. The RX processor converts the OFDMA symbol stream from a time domain to a frequency domain using Fast Fourier Transform (FFT). The frequency domain signal includes a separate OFDMA symbol stream for each subcarrier of the OFDM signal. Symbols and a reference signal on each subcarrier are restored and demodulated by determining the most probable signal disposition points transmitted by the gNB. These soft decisions may be based on channel estimate values. The soft decisions are decoded and deinterleaved to restore data and control signal originally transmitted by the gNB on the physical channel. Corresponding data and control signals are provided to the processor 3121.

UL (communication from the UE to the gNB) is handled at the gNB 3110 in a manner similar to that described in relation to a receiver function at the UE 3120. Each Tx/Rx module 3125 receives a signal through each antenna 3126. Each Tx/Rx module provides an RF carrier and information to the RX processor 3123. The processor 3121 may be associated with the memory 3124 that stores program codes and data. The memory may be referred to as a computer readable medium.

In the present disclosure, the wireless device may be a gNB, a network node, a transmitting UE, a receiving UE, a wireless device, a wireless communication device, a vehicle, a vehicle equipped with an autonomous driving function, an UAV, an AI module, a robot, an AR device, a VR device, an MTC device, an IoT device, a medical device, a FinTech device (or financial device), a security device, a climate/environment device, or a device related to a fourth industrial revolution field or 5G service. For example, the UAV may be a vehicle flying by a radio control signal without onboarding of a human. For example, the MTC device and the IoT device are devices that do not require direct human intervention or manipulation, and may be a smart meter, a bending machine, a thermometer, a smart light bulb, a door lock, and various sensors. For example, a medical device may be a device for treatment, a device for surgery, a device for (extra-corporal) diagnosis, a hearing aid, or a device for a surgical procedure as a device used for the purpose of diagnosing, treating, alleviating, or preventing a disease and a device used for the purpose of examining, replacing or modifying a structure or function. For example, the security device may be a device installed to prevent a risk that may occur and to maintain safety and be a camera, a CCTV, or a black box. For example, a FinTech device may be a payment device or a point of sales (POS) as a device capable of providing financial services such as mobile payment. For example, the climate/environment device may mean a device that monitors or predicts the climate/environment.

In the present disclosure, the UE may include a mobile phone, a smart phone, a laptop computer, a digital broadcasting UE, a personal digital assistant (PDA), a portable multimedia player (PMP), a navigation device, a slate PC, a tablet PC, an ultrabook, a wearable device (e.g., smartwatch, smart glass, head mounted display (HMD)), a foldable device, and the like. For example, the HMD is a display device of a type worn on the head and may be used to implement VR or AR.

The above-described embodiments are those in which components and features of the present disclosure are combined in a predetermined form. Each component or feature should be considered optional unless explicitly stated otherwise. Each component or feature may be implemented in the form that is not combined with other components or features. Further, it is also possible to constitute an embodiment of the present disclosure by combining some components and/or features. The order of operations described in the embodiments of the present disclosure may be changed. Some components or features of one embodiment may be included in other embodiments, or may be replaced with corresponding components or features of other embodiments. It is obvious that claims that do not have an explicit citation relationship in the claims may be combined to constitute an embodiment or may be included as a new claim by amendment after filing.

The embodiment according to the present disclosure may be implemented by various means, for example, hardware, firmware, software, or a combination thereof. In the case of implementation by hardware, an embodiment of the present disclosure may be implemented by one or more application specific integrated circuits (ASICs), digital signal processors (DSPs), digital signal processing devices (DSPDs), programmable logic devices (PLDs), and field programmable gate arrays (FPGAs), processors, controllers, microcontrollers, microprocessors, etc.

In the case of implementation by firmware or software, an embodiment of the present disclosure may be implemented in the form of a module, procedure, or function that performs the above-described functions or operations. A software code may be stored in a memory to be driven by a processor. The memory may be positioned inside or outside the processor, and may exchange data with the processor through various known means.

It is obvious to a person skilled in the art that the present disclosure may be embodied in other specific forms without departing from essential features thereof. Therefore, the above detailed description should not be construed as restrictive in all respects and should be considered as illustrative. The scope of the present disclosure should be determined by reasonable interpretation of the appended claims, and all changes within the equivalent range of the present disclosure are included in the scope of the present disclosure.

INDUSTRIAL APPLICABILITY

A method of performing uplink transmission in a wireless communication system of the present disclosure has been described centering on examples applied to a 3GPP LTE/LTE-A system and 5G, but it can be applied to various wireless communication systems.

The invention claimed is:

1. A method for transmitting an uplink signal in a wireless communication system, the method performed by a terminal comprising:
  transmitting, to a base station, a physical random access channel (PRACH) preamble,
  wherein the PRACH preamble is transmitted based on a Contention Free Random Access (CFRA) resource or a Contention Based Random Access (CBRA) resource;
  receiving, from the base station, a random access response (RAR),
  wherein the RAR is related to a Physical Downlink Control Channel (PDCCH) which is received within a pre-configured window, the PDCCH is related to a Random Access (RA)-Radio Network Temporary Identifier (RNTI), and a length of the pre-configured window is configured based on a number of slots; and
  transmitting, to the base station, the uplink signal based on the RAR,
  wherein, based on the PDCCH, a Physical Downlink Shared Channel (PDSCH) is received within the pre-configured window and the PDSCH is related to a transport block for an uplink (UL) grant,
  wherein the uplink signal is based on a Physical Uplink Shared Channel (PUSCH) scheduled by the UL grant,
  wherein the PRACH preamble is transmitted based on a transmission unit,
  wherein the transmission unit is based on a set of uplink physical channel resources for which a common timing advance (TA) value and common power control parameters are applied,
  wherein the set of uplink physical channel resources is based on a set including the PRACH preamble, a Sounding Reference Signal (SRS) resource, a Physical Uplink Control Channel (PUCCH) resource, and a Physical Uplink Shared Channel (PUSCH) resource, and
  wherein transmission unit configuration information for the transmission unit configured in the terminal is transmitted to the base station through the PRACH preamble or the uplink signal.

2. The method of claim 1, further comprising transmitting a first message comprising at least one of information on the total number of transmission units or information on the maximum number of transmission units that can be simultaneously transmitted to the base station.

3. The method of claim 2, wherein the first message further comprises information on a time or a gap symbol required for switching between transmission units.

4. The method of claim 3, wherein the information on the time or gap symbol indicates at least one symbol or at least one slot.

5. The method of claim 1, wherein the transmission unit configuration information comprises at least one of a downlink reference signal (DL RS) associated with the transmission unit, a SRS resource associated with the transmission unit, a PUCCH resource associated with the transmission unit, or a PUSCH resource associated with the transmission unit.

6. The method of claim 1, wherein the common TA value is applied in one component carrier (CC) or one bandwidth part (BWP).

7. The method of claim 1, wherein the common power control parameters are applied in one CC or one BWP.

8. A terminal configured to transmit an uplink signal in a wireless communication system, the terminal comprising:
  a radio frequency (RF) module;
  at least one processor; and
  at least one computer memory operably accessible to the at least one processor and for storing instructions for performing operations based on being executed by the at least one processor,
  wherein the operations comprise:
  transmitting, to a base station, a physical random access channel (PRACH) preamble, wherein the PRACH preamble is transmitted based on a Contention Free Random Access (CFRA) resource or a Contention Based Random Access (CBRA) resource;
  receiving, from the base station, a random access response (RAR),
  wherein the RAR is related to a Physical Downlink Control Channel (PDCCH) which is received within a pre-configured window, the PDCCH is related to a Random Access (RA)-Radio Network Temporary Identifier (RNTI) and a length of the pre-configured window is configured based on a number of slots; and
  transmitting, to the base station, the uplink signal based on the RAR,
  wherein, based on the PDCCH, a Physical Downlink Shared Channel (PDSCH) is received within the pre-configured window and the PDSCH is related to a transport block for an uplink (UL) grant,
  wherein the uplink signal is based on a Physical Uplink Shared Channel (PUSCH) scheduled by the UL grant, wherein the PRACH preamble is transmitted based on a transmission unit, wherein the transmission unit is based on a set of uplink physical channel resources for which a common timing advance (TA) value and common power control parameters are applied, wherein the set of uplink physical channel resources is based on a set including the PRACH preamble, a Sounding Reference Signal (SRS) resource, a Physical Uplink Control Channel (PUCCH) resource, and a Physical Uplink Shared Channel (PUSCH) resource, and wherein transmission unit configuration information for the transmission unit configured in the terminal is transmitted to the base station through the PRACH preamble or the uplink signal.

9. The terminal of claim 8, wherein the operations further comprise transmitting a first message comprising at least one of information on the total number of transmission units or information on the maximum number of transmission units that can be simultaneously transmitted to the base station.

10. The terminal of claim 9, wherein the first message further comprises information on a time or a gap symbol required for switching between transmission units.

11. The terminal of claim 10, wherein the information on the time or gap symbol indicates at least one symbol or at least one slot.

12. The terminal of claim 8, wherein the transmission unit configuration information comprises at least one of a downlink reference signal (DL RS) associated with the transmission unit, a SRS resource associated with the transmission unit, a PUCCH resource associated with the transmission unit, or PUSCH resource associated with the transmission unit.

13. The terminal of claim 8, wherein the common TA value is applied in one component carrier (CC) or one bandwidth part (BWP).

14. The terminal of claim 8, wherein the common power control parameters are applied in one CC or one BWP.

15. A base station configured to receive an uplink signal in a wireless communication system, the base station comprising:

a radio frequency (RF) module;
at least one processor; and
at least one computer memory operably accessible to the at least one processor and for storing instructions for performing operations based on being executed by the at least one processor, wherein the operations comprise:
receiving, from a terminal, a physical random access channel (PRACH) preamble, wherein the PRACH preamble is received based on a Contention Free Random Access (CFRA) resource or a Contention Based Random Access (CBRA) resource;

transmitting, to the terminal, a random access response (RAR), wherein the RAR is related to a Physical Downlink Control Channel (PDCCH) which is transmitted within a pre-configured window, the PDCCH is related to a Random Access (RA)-Radio Network Temporary Identifier (RNTI) and a length of the pre-configured window is configured based on a number of slots; and receiving, from the terminal, the uplink signal based on the RAR, wherein, based on the PDCCH, a Physical Downlink Shared Channel (PDSCH) is transmitted within the pre-configured window and the PDSCH is related to a transport block for an uplink (UL) grant, wherein the uplink signal is based on a Physical Uplink Shared Channel (PUSCH) scheduled by the UL grant, wherein the PRACH preamble is received based on a transmission unit, wherein the transmission unit is based on a set of uplink physical channel resources for which a common timing advance (TA) value and common power control parameters are applied, wherein the set of uplink physical channel resources is based on a set including the PRACH preamble, a Sounding Reference Signal (SRS) resource, a Physical Uplink Control Channel (PUCCH) resource and a Physical Uplink Shared Channel (PUSCH) resource, wherein transmission unit configuration information for the transmission unit configured in the terminal is received from the terminal through the PRACH preamble or the uplink signal.

* * * * *